(12) United States Patent
Qi et al.

(10) Patent No.: US 9,182,952 B2
(45) Date of Patent: Nov. 10, 2015

(54) AUTOMATED GRAPH-BASED PROGRAMMING

(71) Applicant: QUALCOMM Incorporated, San Diego, CA (US)

(72) Inventors: Yingyong Qi, San Diego, CA (US); Ananthapadmanabhan Arasanipalai Kandhadai, San Diego, CA (US); Magdi Abuelgasim Mohamed, San Diego, CA (US); Shuxue Quan, San Diego, CA (US); Binglong Xie, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 165 days.

(21) Appl. No.: 14/034,181

(22) Filed: Sep. 23, 2013

(65) Prior Publication Data

US 2014/0359559 A1 Dec. 4, 2014

Related U.S. Application Data

(60) Provisional application No. 61/831,078, filed on Jun. 4, 2013.

(51) Int. Cl.
G06F 9/44 (2006.01)
G06F 9/45 (2006.01)

(52) U.S. Cl.
CPC .. *G06F 8/35* (2013.01); *G06F 8/34* (2013.01); *G06F 8/42* (2013.01); *G06F 8/44* (2013.01)

(58) Field of Classification Search
CPC ........................................................ G06F 8/35

USPC .......................................................... 717/105
See application file for complete search history.

(56) References Cited

U.S. PATENT DOCUMENTS

| 5,386,508 | A | * | 1/1995 | Itonori et al. .................. 717/109 |
| 6,957,412 | B1 | * | 10/2005 | Betz et al. ...................... 716/103 |
| 7,720,316 | B2 | * | 5/2010 | Shilman et al. ................. 382/311 |
| 8,014,607 | B2 | * | 9/2011 | Saund et al. .................. 382/187 |
| 8,238,666 | B2 | | 8/2012 | Besley et al. |
| 8,274,567 | B2 | * | 9/2012 | Raghoebardajal et al. 348/207.1 |
| 2004/0090439 | A1 | * | 5/2004 | Dillner .......................... 345/440 |
| 2011/0141301 | A1 | * | 6/2011 | Raghoebardajal et al. 348/222.1 |
| 2012/0169772 | A1 | | 7/2012 | Werner et al. |

(Continued)

OTHER PUBLICATIONS

Szwoch, Recognition, Understanding and Aestheticization of Freehand Drawing Flowcharts, IEEE (2007) Applicant Provided Prior Art.*

(Continued)

*Primary Examiner* — Don Wong
*Assistant Examiner* — Theodore Hebert
(74) *Attorney, Agent, or Firm* — Toler Law Group, PC

(57) ABSTRACT

A method includes capturing an image of a scene that includes a diagram. The method further includes applying functional block recognition rules to image data of the image to recognize functional blocks of the diagram. The functional blocks include at least a first functional block associated with a first computer operation. The method further includes determining whether the functional blocks comply with functional block syntax rules. A functional graph is computer-generated based on the functional blocks complying with the functional block syntax rules. The functional graph corresponds to the diagram, and the functional graph includes the functional blocks.

38 Claims, 13 Drawing Sheets

(56) References Cited

U.S. PATENT DOCUMENTS

| | | | |
|---|---|---|---|
| 2013/0004069 A1* | 1/2013 | Hawkins et al. | 382/165 |
| 2013/0111432 A1* | 5/2013 | Gery et al. | 717/104 |
| 2014/0359559 A1* | 12/2014 | Qi et al. | 717/105 |

OTHER PUBLICATIONS

Bischof, M., et al. "BPELscript: A Simplified Script Syntax for WS-BPEL 2.0," 35th Euromicro Conference on Software Engineering and Advanced Applications, 2009, IEEE, Piscataway, NJ, pp. 39-46.

Dooley, J.W.M. et al., "Flow: A Software Development Environment Using Diagrams," Journal of Systems & Software, Aug. 1985, vol. 5, Issue 3, Elsevier Incorporated, Amsterdam, Netherlands, pp. 203-219.

International Search Report and Written Opinion for International Application No. PCT/US2014/040701, ISA/EPO, Date of Mailing Sep. 4, 2014, 11 pages.

Gross M.D. "Recognizing and Interpreting Diagrams in Design," Division of Environmental Design and Institute of Cognitive Science, University of Colorado, Boulder, Colorado, 1994, pp. 88-94.

Szwoch W. "Recognition, Understanding and Aestheticization of Freehand Drawing Flowcharts," IEEE, 2007, pp. 1138-1142, Faculty of ETI, Gdansk University of Technology, Poland.

Yu Y. et al., "A System for Recognizing a Large Class of Engineering Drawings," IEEE Transactions on Pattern Analysis and Machine Intelligence, Aug. 1997, pp. 868-890, vol. 19 (8).

Chan K. F. et al., "Mathematical Expression recognition," Technical Report HKUST-CS99-04, Apr. 1999, pp. 1-24.

Matsuo, K. et al., "Outdoor Visual Localization with a Hand-Drawn Line Drawing Map using FastSLAM with PSO-based Mapping," IEEE/RSJ International Conference on Intelligent Robots and Systems, Oct. 7-12, 2012, pp. 202-207.

Skubic, M. et al., "Hand-Drawn Maps for Robot Navigation," 2002 AAAI Spring Symposium, Technical Report SS-02-08, Mar. 2002, pp. 8.

Mohamed, M. A. et al., "Generalized Hidden Markov Models—Part II: Application to Handwritten Word Recognition," in the IEEE Transactions on Fuzzy Systems, Feb. 2000.

* cited by examiner

AUTOMATED GRAPH-BASED PROGRAMMING

CROSS-REFERENCE TO RELATED APPLICATIONS

The present application claims priority to and the benefit of U.S. Provisional Patent Application No. 61/831,078 filed on Jun. 4, 2013, the content of which is expressly incorporated herein by reference in its entirety.

II. FIELD

The present disclosure is generally related to graph-based programming and more particularly to automated graph-based programming.

III. DESCRIPTION OF RELATED ART

Advances in technology have resulted in smaller and more powerful electronic devices and communication systems. For example, there currently exist a variety of mobile devices, such as wireless telephones, personal digital assistants (PDAs), computer tablets, and paging devices. The mobile devices may be small, lightweight, and easily carried by users. Wireless telephones, such as cellular telephones and Internet Protocol (IP) telephones, can communicate voice and data packets over wireless networks. Further, many wireless telephones include other types of devices that are incorporated therein. For example, a wireless telephone can also include a digital still camera, a digital video camera, a digital recorder, and an audio stream player. Also, wireless telephones can process executable instructions, including software applications, such as a web browser application, that can be used to access the Internet. As such, wireless telephones and other mobile devices can include significant computing capabilities. However, implementing these computing capabilities may involve a large amount of coding by computer programmers, which can be expensive and time-consuming.

Graph-oriented programming (GOP) (also referred to herein as "graph-based programming") enables computer programmers to generate code using graphs that represent computer programs. For example, computer programmers may create a functional graph using a programming interface at a computer. The functional graph may include nodes and interconnections between the nodes illustrating certain sequences of operations. After creation of the functional graph, code may be generated based on the functional graph. The code may be executable by a computer to perform operations indicated by the functional graph. As a particular example, if the functional graph depicts operations indicating to add two numbers if a condition is satisfied, the code may be executed at the computer to add the two numbers if the condition is satisfied.

IV. SUMMARY

Some software developers find conventional graph-based programming techniques time-consuming and cumbersome. For example, software developers may avoid using graph-based programming in favor of other programming techniques due to the large amount of time needed to become proficient with graph-based programming. Graph-based programming may therefore be an underutilized resource for software developers and other programmers (e.g., due to a "learning curve" associated with graph-based programming). In particular, a need exists for graph-based programming techniques that enable users to efficiently construct complex functional graphs that utilize "functional blocks" representing certain programming operations.

Techniques are disclosed for automated graph-based programming. The techniques may enable an image of a diagram to be captured and a functional graph to be computer-generated based on the image. In a particular embodiment, functional block recognition rules (e.g., a graph lexicon database) and functional block syntax rules are applied to image data of the image to recognize functional blocks of the diagram. The functional blocks may correspond to high-level operations (e.g., functions, routines, etc.) to be performed during execution of the program code. For example, the functional blocks may correspond to image processing tasks. Such techniques may reduce or avoid instances of a user "manually" creating the functional graph at a programming interface. In particular, the techniques may enable the user to simply sketch a diagram (e.g., draw a diagram by hand at a whiteboard) and then capture an image of the diagram (e.g., using a camera of a mobile device). The functional graph may be automatically generated by a computer based on the image. The image may be captured using an image sensor, such as a charge-coupled device (CCD) image sensor or a complementary metal-oxide-semiconductor (CMOS) image sensor. The image may be generated based on input at a touchscreen (e.g., using a stylus and/or user fingers), based on input from a computer input device (e.g., input from a mouse device), or a combination thereof. The computer-generated functional graph may be converted to program code (e.g., computer-readable instructions).

By using techniques described herein, complicated user operations may be avoided or simplified (e.g., automated). For example, program code may be generated without a user manually constructing the low-level details of the functional graph at a programming interface. The user may simply draw a diagram (e.g., on a whiteboard) instead of entering each element of the functional graph at the programming interface. Further, the techniques described herein may avoid unnecessary duplication of the diagram by the user. For example, the user may have drawn the high-level block diagram while explaining the diagram to colleagues and/or while collaborating with colleagues to create the diagram. After drawing the diagram, the user may simply capture an image of the diagram to create the computer-generated functional graph. A computer may analyze the computer-generated functional graph to generate program code (e.g., program code executable by a computer to perform one or more processing tasks, such as image processing tasks, corresponding to the diagram). By capturing the image of the diagram, the user may avoid duplicating the diagram by "manually" entering information corresponding to the diagram at a programming interface.

In a particular embodiment, a method includes capturing an image of a scene that includes a diagram. The method further includes applying functional block recognition rules to image data of the image to recognize functional blocks of the diagram. The functional blocks include at least a first functional block associated with a first computer operation. The method further includes determining whether the functional blocks comply with functional block syntax rules. A functional graph is computer-generated based on the functional blocks complying with the functional block syntax rules. The functional graph corresponds to the diagram, and the functional graph includes the functional blocks.

In another particular embodiment, an apparatus includes a memory and a processor. The memory is configured to store functional block recognition rules. The processor is configured to apply the functional block recognition rules to image data of an image of a scene that includes a diagram to recognize functional blocks of the diagram. The functional blocks include at least a first functional block associated with a first computer operation. The processor is further configured to determine whether the functional blocks comply with functional block syntax rules and to computer-generate a functional graph corresponding to the diagram based on the functional blocks complying with the functional block syntax rules. The functional graph includes the functional blocks.

In another particular embodiment, an apparatus includes means for storing functional block recognition rules. The apparatus further includes means for applying the functional block recognition rules to image data of an image of a scene that includes a diagram to recognize functional blocks of the diagram, for determining whether the functional blocks comply with functional block syntax rules, and for generating a functional graph corresponding to the diagram based on the functional blocks complying with the functional block syntax rules. The functional blocks include at least a first functional block associated with a first computer operation, and the functional graph includes the functional blocks.

In another particular embodiment, a computer-readable medium stores instructions that are executable by a processor to perform operations. The operations include capturing an image of a scene that includes a diagram. The operations further include applying functional block recognition rules to image data of the image to recognize functional blocks of the diagram. The functional blocks include at least a first functional block associated with a first computer operation. The operations further include determining whether the functional blocks comply with functional block syntax rules and computer-generating a functional graph corresponding to the diagram based on the functional blocks complying with the functional block syntax rules. The functional graph includes the functional blocks.

One particular advantage provided by at least one of the disclosed embodiments is that complicated user operations may be avoided or simplified (e.g., automated). For example, program code may be generated without a user manually constructing the functional graph at a programming interface. The user may simply draw a diagram (e.g., on a whiteboard) instead of entering the functional graph at the programming interface.

Further, the techniques described herein may avoid unnecessary duplication of the diagram by the user. For example, the user may have drawn the diagram while explaining the diagram to colleagues and/or while collaborating with colleagues to create the diagram. After drawing the diagram, the user may simply capture an image of the diagram to create the computer-generated functional graph. Therefore, by capturing the image of the diagram, the user may avoid duplicating the diagram by "manually" entering information corresponding to the diagram at a programming interface. Other aspects, advantages, and features of the present disclosure will become apparent after review of the entire application, including the following sections: Brief Description of the Drawings, Detailed Description, and the Claims.

V. BRIEF DESCRIPTION OF THE DRAWINGS

VI. DETAILED DESCRIPTION

Figure 1A:
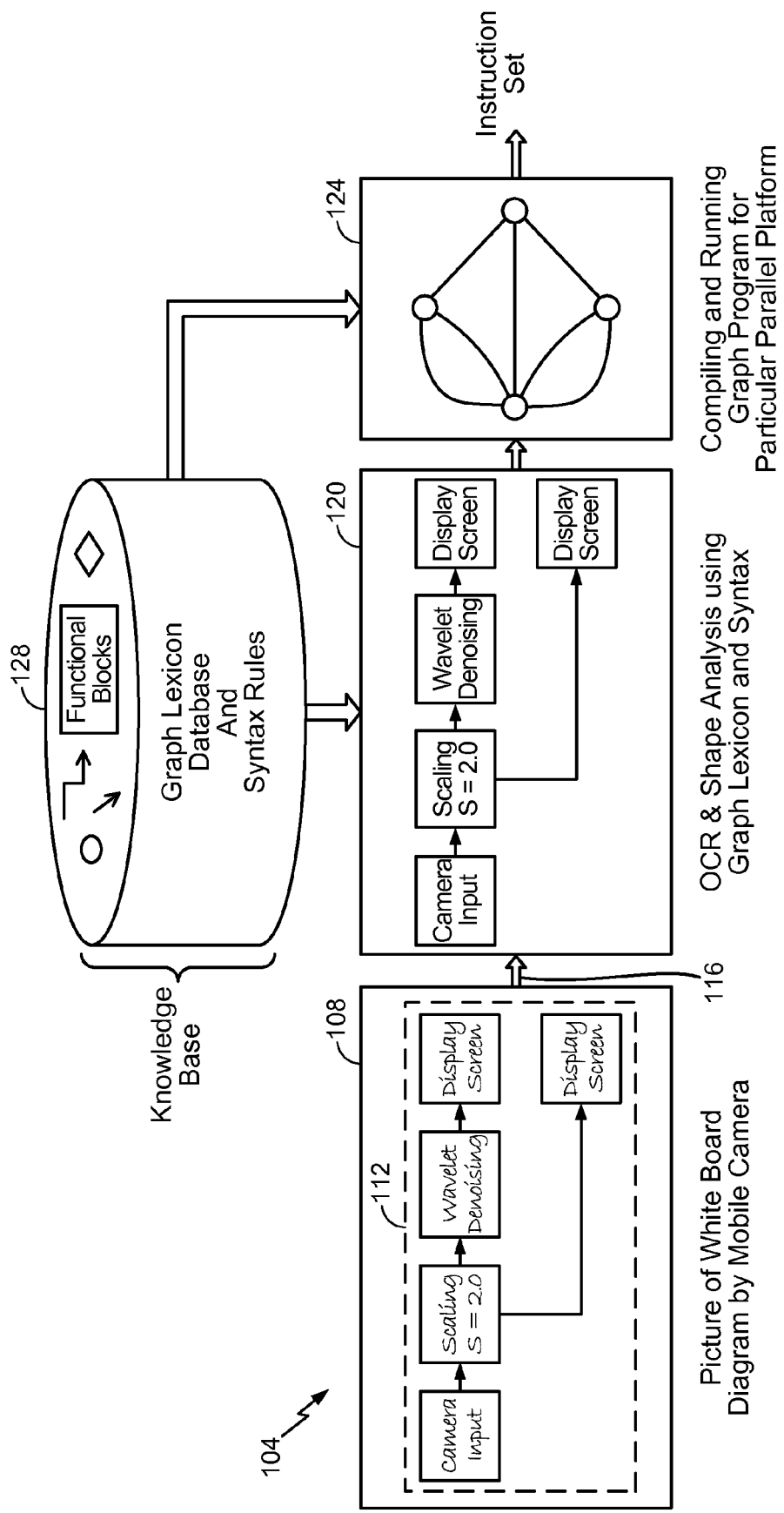
FIG. 1A is a data flow diagram illustrating a particular embodiment of a computer-generated functional graph that is based on an image of a scene that includes a diagram.

FIG. 1A depicts a data flow diagram of a particular illustrative embodiment of a scene 104, an image 116 of the scene 104, and a computer-generated functional graph 124. In the particular example of FIG. 1A, the scene 104 includes a diagram 112 drawn (e.g., hand-drawn by a user) on a whiteboard 108. It should be noted that the reference to a whiteboard is provided as an example. The described techniques may also be used with other backgrounds (e.g., chalkboards, walls, paper/pads, etc.) and/or input devices other than cameras. For example, an image drawn using an electronic tablet, a touchscreen, and/or a mouse device may be captured using a "screen capture" technique instead of using a camera.

The image 116 includes image data corresponding to the scene 104. For example, the image 116 may be captured by a camera of a mobile device. Accordingly, the image data may contain data related to (e.g., representing) features of the diagram 112. In a particular embodiment, the image 116 is a high-resolution image captured using an auto-focus feature of the camera of the mobile device.

The computer-generated functional graph 124 may correspond to the diagram 112. For example, the computer-generated functional graph 124 may be constructed by a processor of the mobile device based on the image data of the image 116. The computer-generated functional graph 124 may include one or more nodes, such as functional blocks, decision blocks, or a combination thereof (also referred to herein as "digital processing blocks"). Each node of the computer-generated functional graph 124 may include a pin that connects such node to another node of the computer-generated functional graph 124 via an interconnection.

In addition, the computer-generated functional graph 124 may include computer-recognized text. It should be appreciated that the particular example of FIG. 1A is illustrative and that a wide variety of graphs and configurations are within the scope of the present disclosure.

An optical character recognition (OCR) and shape analysis 120 may be performed on the image data of the image 116. The OCR and shape analysis 120 may recognize text (e.g., words) and shapes of the diagram 112. The example of FIG. 1A may further include applying a graph lexicon database and syntax rules 128 to the image data. The graph lexicon database and syntax rules 128 may recognize certain functional blocks of the diagram 112. For example, the graph lexicon database and syntax rules 128 may include functional block recognition rules, such as a "dictionary" of functional blocks that is accessed to identify indications in the image data of functional blocks in the diagram 112. The graph lexicon database and syntax rules 128 may further indicate functional block syntax rules, such as a hierarchy of functional blocks that indicates acceptable sequences of functional blocks, unacceptable sequences of functional blocks, or a combination thereof.

To illustrate, the particular example of FIG. 1A shows that the diagram 112 indicates a scaling functional block corresponding to a scaling operation and a wavelet denoising functional block corresponding to a wavelet denoising operation. The functional block syntax rules may specify that wavelet denoising operations can be performed after, but not before, scaling operations in a particular application. As another example, the functional block syntax rules may specify that the scaling functional block should have at least one output (e.g., if one or more results of performing the scaling operation are to be provided to a display device). If application of the graph lexicon database and syntax rules 128 to the image data initially indicates that the denoising operation is to be performed before the scaling operation (e.g., due to a poorly drawn arrow or connection in the diagram 112), then the image data may be re-analyzed to determine if the diagram 112 has not been correctly recognized. For example, additional processing resources and/or an additional algorithm may be performed to re-recognize the scaling functional block, the wavelet denoising functional block, the connection between the scaling functional block and the wavelet denoising functional block, or a combination thereof. As another example, a user may be prompted to confirm whether the wavelet denoising operation should be performed after the scaling operation.

The functional block syntax rules may further specify certain graph topology rules. Particular illustrative examples of graph topology rules include a rule specifying that a graph runs in a context and that a context can have multiple graphs. A rule may specify that a graph has nodes and connections and that a node has pins to interact with other graph components. A rule may specify that a pin is either an input pin or an output pin and that each node has zero or more input pins and zero or more output pins, where the combined sum of input and output pins is greater than or equal to one. A rule may specify that an interconnection connects an input pin to an output pin and that no connection may be made between two input pins or between two output pins. A rule may specify that an output pin may connect to one or more input pins and that an input pin can be connected to only one output pin. A rule may specify that interconnections cannot create a loop among the node(s), unless such loop includes one or more delay nodes. A rule may specify that a node may have zero or more properties that parameterize and configure the node and that a type of a node determines the type and value range of the properties of the node, if any.

Constructing the computer-generated functional graph 124 based on the image data of the image 116 facilitates simplified (e.g., automated) graph-based programming. For example, as explained further below, the computer-generated functional graph 124 may be generated using diagram-to-graph conversion rules that enable the user to draw the diagram 112 upon the whiteboard 108 and capture the image 116. Program code may be generated based on the computer-generated functional graph 124. The program code may be executed by a computer to perform one or more processing tasks corresponding to the diagram 112. Thus, the image 116 may be used to create the computer-generated functional graph 124 instead of a user "manually" constructing a functional graph by performing multiple steps and entering each element of the diagram 112 at an interface, such as at a programming interface of a computer. Therefore, constructing the computer-generated functional graph 124 according to the techniques of FIG. 1A is simplified for the user as compared to conventional graph-based programming techniques.

Figure 1B:
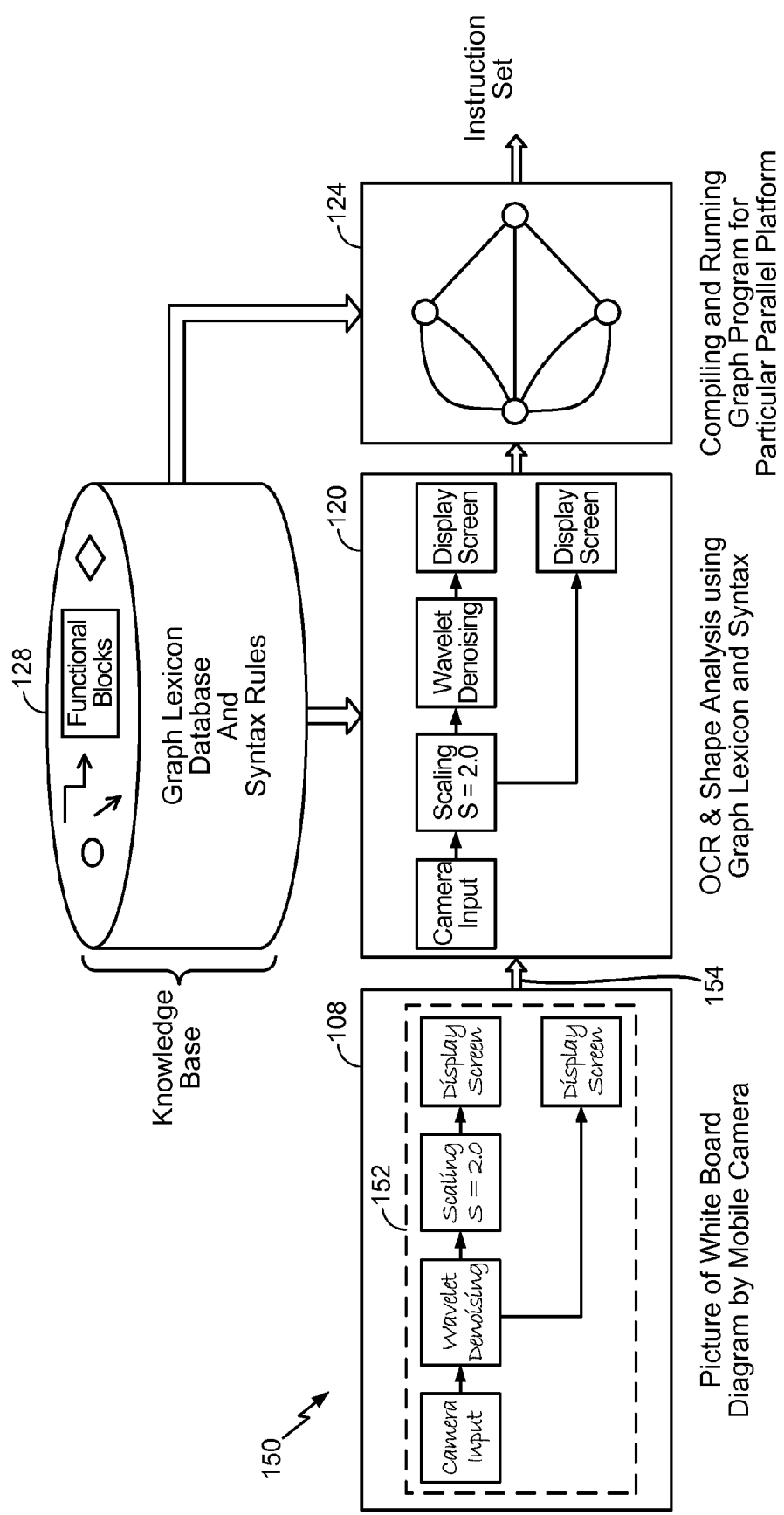
FIG. 1B is a data flow diagram of another particular embodiment of a computer-generated functional graph that is based on another image of a scene that includes another diagram.

FIG. 1B depicts a data flow diagram of a particular illustrative embodiment of a scene 150 that includes a diagram 152. Certain features of FIG. 1B may be as described with reference to FIG. 1A. For example, the particular example of FIG. 1B includes the whiteboard 108, the OCR and shape analysis 120, the computer-generated functional graph 124, and the graph lexicon database and syntax rules 128. The OCR and shape analysis 120 may be performed using image data of an image 154 of the scene 150.

In FIG. 1B, the diagram 152 is drawn "incorrectly" as compared to the diagram 112 of FIG. 1A. For example, a wavelet denoising operation precedes a scaling operation in the diagram 152, and a wavelet denoising operation follows a scaling operation in the diagram 112. As will be appreciated, such an error may result from a user incorrectly or poorly drawing the diagram 152 (e.g., due to a poorly drawn or ambiguous arrow or connection). Alternatively or in addition, image quality of the image 154 may cause image recognition problems at the OCR and shape analysis 120 (e.g., due to poor lighting when the image 154 is captured).

The OCR and shape analysis 120 may "correct" one or more problems associated with the image 154. In a particular illustrative embodiment, the graph lexicon database and syntax rules 128 include a "hierarchy" of operations corresponding to functional blocks, such as by indicating an order of functions associated with functional blocks. As a particular illustrative example, the graph lexicon database and syntax rules 128 may indicate that a first computer operation, such as a scaling operation should precede rather than follow a second computer operation, such as a wavelet denoising operation. Upon applying the graph lexicon database and syntax rules 128, a determination may be made that the diagram 152 is "incorrect" because the scaling operation follows the wavelet denoising operation in the diagram 152. Accordingly, in the example of FIG. 1B, the OCR and shape analysis 120 "corrects" the diagram 152 and prompts a user to confirm that the computer-generated functional graph 124 is correct.

Because the graph lexicon database and syntax rules 128 may be applied to recognize "errors" in the image 154 of the diagram 152, computer-generation of functional graphs is simplified. For example, computer-generation of functional graphs is simplified as compared to certain conventional systems that do not detect syntax errors in user-generated functional graphs.

Figure 1C:
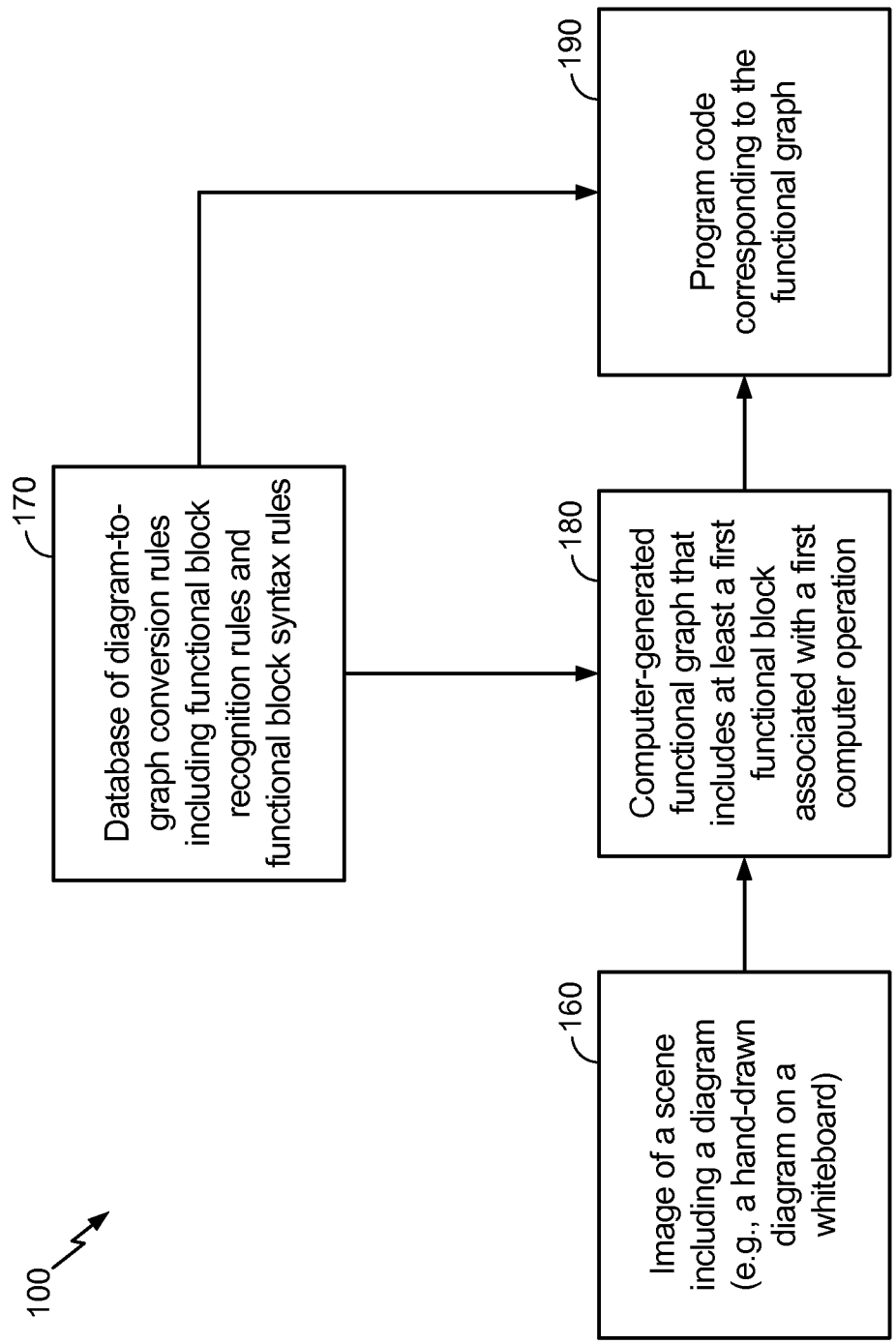
FIG. 1C is a data flow diagram of another particular embodiment of a computer-generated functional graph that is based on an image of a scene that includes a diagram.

Referring to FIG. 1C, a particular illustrative data flow diagram is depicted and generally designated 100. In a particular embodiment, the data flow diagram 100 illustrates construction of the computer-generated functional graph 124.

An image of a scene including a diagram is captured, at 160. The image may correspond to the image 116, and the scene may correspond to the scene 104. The diagram may correspond to the diagram 112. Alternatively, the image may correspond to the image 154, the diagram may correspond to the diagram 152, and the scene may correspond to the scene 150.

At 170, a database of diagram-to-graph conversion rules is accessed. The database of diagram-to-graph conversion rules may include functional block recognition rules and functional block syntax rules, such as graph topology rules, graph interconnection rules, linguistic rules, or a combination thereof. The database of diagram-to-graph conversion rules may correspond to the graph lexicon database and syntax rules 128.

As a particular example, the graph topology rules may include rules for recognizing nodes of the diagram, such as functional blocks, decision blocks, or a combination thereof. The graph interconnection rules may include rules for recognizing interconnections of the diagram and pins of the diagram. The linguistic rules may include rules for recognizing text of the diagram, such as optical character recognition (OCR) rules, vocabulary rules, syntax rules, or a combination thereof.

At 180, a functional graph is computer-generated by applying one or more of the diagram-to-graph conversion rules to image data of the image. The computer-generated functional graph includes at least a first functional block associated with a first computer operation. As an illustrative example, the first functional block may correspond to any of the functional blocks described herein, such as a denoising functional block or a scaling functional block. The first computer operation may correspond to any of the computer operations described herein, such as a denoising computer operation or a scaling computer operation. Alternatively or in addition, the first functional block and the first computer operation may correspond to one or more other functional blocks and computer operations.

The one or more diagram-to-graph conversion rules may include "graph lexicon database and syntax rules" that enable optical character recognition (OCR) of text of the diagram and that further enable shape analysis of shapes of the diagram. For example, shapes of the diagram may be computer-recognized as functional blocks, decision blocks, and interconnections. The one or more diagram-to-graph conversion rules may include "filtering" rules that filter noise (e.g., artifacts) from the diagram, such as extraneous shapes or scribbles of the diagram. As used herein, "segmentation and recognition" may refer to such OCR, shape analysis, and filtering.

In addition, at 190, program code corresponding to the computer-generated functional graph may be generated. The program code may be executable by a processor to perform one or more operations indicated by the functional graph.

As a particular example, the diagram-to-graph conversion rules may be applied to the image data of the image 116 to identify features of the diagram 112. Applying the diagram-to-graph conversion rules may include generating an adjacency list or an adjacency matrix data structure indicating relationships of graph components (e.g., adjacencies of the graph components) of the diagram 112 based on the image data of the image 116. Graph topology rules may be accessed to recognize nodes of the diagram 112, such as by accessing rules that indicate node properties. For example, the node properties may include a range of acceptable dimensions (e.g., length, width, and/or height) for components of the diagram. Further, graph interconnection rules may facilitate recognition of interconnections by specifying interconnection properties, such as a range of acceptable dimensions for the interconnections.

Because the program code is generated based on the image of the scene including the diagram, certain user operations may be avoided or simplified (e.g., automated). In particular, the program code of FIG. 1C may be generated without a user manually entering input and performing multiple steps to construct the functional graph at a programming interface. That is, the user may simply draw the diagram (e.g., on a suitable surface, such as the whiteboard 108) instead of entering each item of the functional graph and interconnections thereof into the programming interface. The techniques described herein may also avoid unnecessary duplication of the diagram by the user. For example, the user may draw the diagram while explaining the diagram to colleagues and/or while collaborating with colleagues to create the diagram. After drawing the diagram, the user may capture an image of the diagram (e.g., using a camera of a mobile device) to create the computer-generated functional graph. Program code may be generated based on the computer-generated functional graph. The program code may be executed by a computer to perform one or more processing tasks, such as image processing tasks, that correspond to the diagram. Therefore, by capturing the image of the diagram, the user may avoid duplicating the diagram by "manually" entering details of the diagram at a programming interface.

Figure 2:
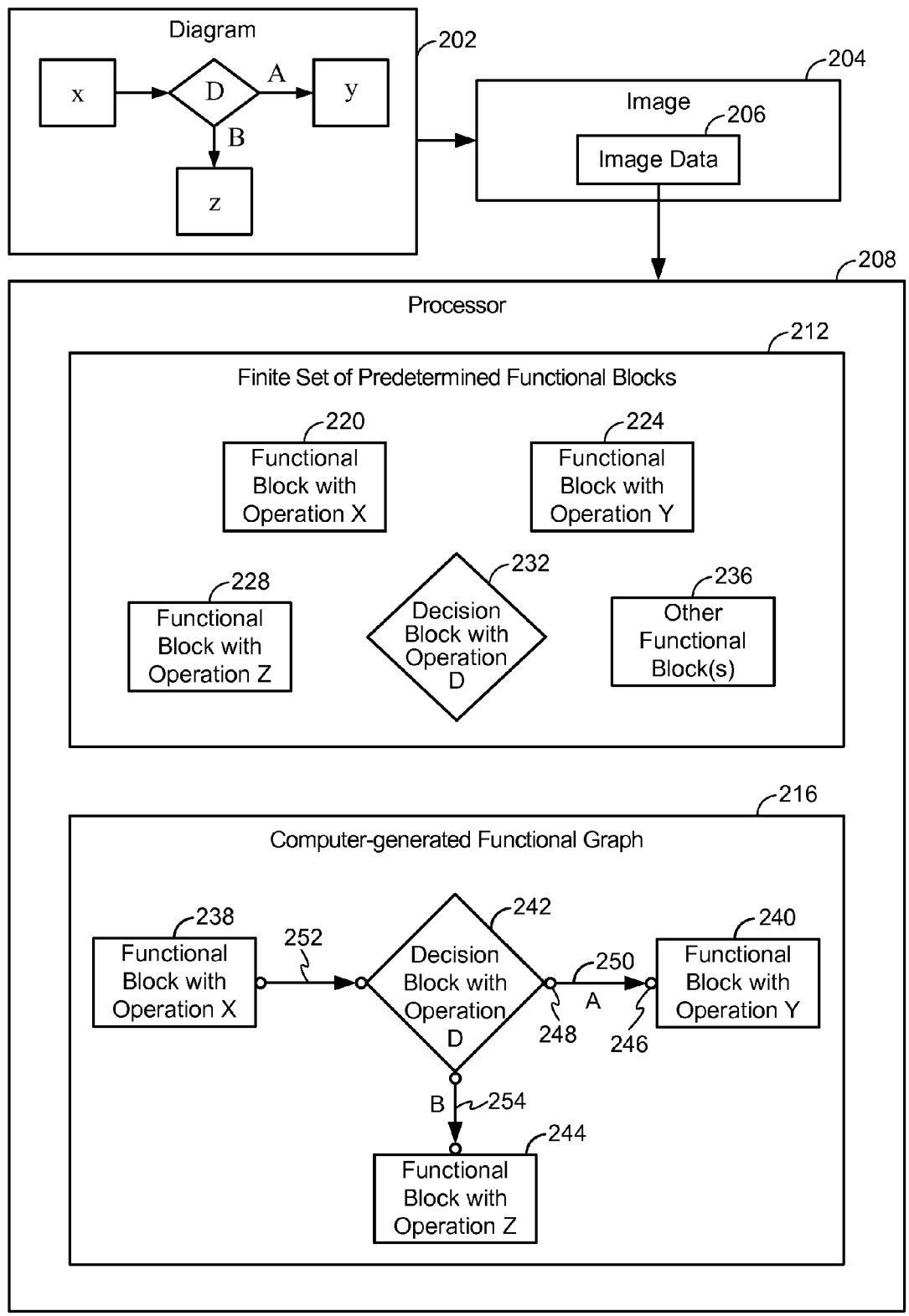
FIG. 2 is a diagram of a particular illustrative embodiment of a scene and a processor configured to computer-generate a functional graph based on the scene using a finite set of predetermined functional blocks.

FIG. 2 is a diagram of a particular illustrative embodiment of a diagram 202, an image 204, and a processor 208 that is configured to construct a computer-generated functional graph 216 based on the image 204 using a finite set of predetermined functional blocks 212. The diagram 202 may correspond to a hand-drawn diagram. The image 204 may be captured by a camera, such as a camera of a mobile device. The processor 208 may be included in the mobile device, or in another device (e.g., a desktop computer). In a particular embodiment, the image 204 is a high-resolution image captured using an auto-focus feature of the camera of the mobile device.

The image may capture certain features of the diagram 202. For example, in the particular example of FIG. 2, the diagram 202 includes functional blocks "X," "Y," "Z," and "D." The functional block "D" corresponds to a decision block associated with a determination of "A" or "B" (i.e., a determination of "A" indicates that operation is to flow to the functional block "Y," and a determination of "B" indicates that operation is to flow to the functional block "Z"). It should be appreciated that the description of characters "X," "Y," "Z," "D," "A," and "B" is illustrative and that one or more such characters may correspond to names of computer functions (e.g., "wavelet denoising") that can be computer-recognized and performed by the processor 208.

In operation, the processor 208 may be responsive to image data 206 of the image 204. The processor 208 may construct the computer-generated functional graph 216 by analyzing the image data 206. The processor 208 may recognize functional blocks of the image 204, such as by applying the graph lexicon database and syntax rules 128 to the image data 206. In the particular illustrative example of FIG. 2, the processor 208 matches recognized functional blocks of the image 204 to a library of functional blocks, such as the finite set of predetermined functional blocks 212. As illustrated in FIG. 2, the finite set of predetermined functional blocks 212 includes certain functional blocks that can be mapped to the image 204, such as functional blocks 220, 224, 228, 232, and 236. The finite set of predetermined functional blocks 212 may correspond to a library of computer functions that is "constrained" for recognition of a certain group of functional blocks, such as functional blocks corresponding to computer vision functions that are called during execution of a computer vision application.

Each of the functional blocks 220, 224, 228, 232, 236 may be associated with a respective set of lexicon and syntax rules indicated by the graph lexicon database and syntax rules 128. Further, the processor 208 may perform the OCR and shape analysis 120 using the graph lexicon database and syntax rules 128 to "match" functional blocks of the diagram 202 indicated by the image data 206 to one or more of the functional blocks 220, 224, 228, 232, and 236. As a result, the processor 208 is configured to construct the computer-generated functional graph 216.

The computer-generated functional graph 216 may include one or more nodes, such as functional blocks, decision blocks, or a combination thereof, such as functional blocks corresponding to the diagram 202. To illustrate, in the particular example of FIG. 2, the computer-generated functional graph 216 includes a functional block 238 indicating a computer operation "X," a functional block 240 indicating a computer operation "Y," a functional block 242 indicating a computer determination operation "D," and a functional block 244 indicating a computer operation "Z." The functional block 242 may be associated with a determination of "A" or "B," as illustrated. As a particular example, the computer determination operation "D" may include comparing a first number and a second number, where a result "A" occurs in response to a determination that the first number is less than or equal to the second number, and where a result "B" occurs in response to a determination that the first number is greater than the second number. Alternatively or in addition, the computer determination operation "D" may correspond to another computer determination operation. Further, as explained above, each of the characters "X," "Y," "Z," "D," "A," and "B" is provided for purposes of illustration, and each of the characters "X," "Y," "Z," "D," "A," and "B" may indicate one or more computer operations, such as computer vision operations.

Each node of the computer-generated functional graph 216 may include a pin that connects such node to another node of the computer-generated functional graph 216 via an interconnection. For example, the functional block 240 includes an input pin 246, and the functional block 242 includes an output pin 248. The computer-generated functional graph 216 further includes an interconnection 250 connecting the input pin 246 and the output pin 248. In addition, the computer-generated functional graph 216 may include computer-recognized text, depicted as "X," "Y," "D," "Z," "A," and "B" in the example of FIG. 2. It should be appreciated that the particular example of FIG. 2 is illustrative and that other graphs and configurations are within the scope of the present disclosure.

Each node of the computer-generated functional graph 216 may correspond to a computer operation (e.g., function) that accepts one or more arguments and that outputs one or more results. To illustrate, FIG. 2 depicts that the functional block 238 outputs a result 252. The result 252 may correspond to a result of performing the computer operation "X." The result 252 may correspond to an argument accepted by the computer determination operation "D" corresponding to the functional block 242. Performing the computer determination operation "D" using the result 252 as an argument of the computer determination operation "D" may generate a result 254. The functional block 244 may perform the computer operation "Z" using the result 254 as an argument. As a particular non-limiting example, the computer determination operation "D" may include determining whether the result 252 is greater than another number, such as another argument input to the functional block 242 by another node of the computer-generated functional graph 216.

Constructing the computer-generated functional graph 216 using the finite set of predetermined functional blocks 212 facilitates simplified (e.g., automated) graph-based programming. For example, as explained further below, the computer-generated functional graph 216 may be generated using diagram-to-graph conversion rules that enable the user to draw a diagram, such as the diagram 202, upon the whiteboard 108 and to capture an image, such as the image 204, to create the computer-generated functional graph 216 instead of "manually" constructing a functional graph by a user performing multiple steps and entering data input at an interface, such as at a programming interface of a computer. Therefore, constructing the computer-generated functional graph 216 according to the techniques of FIG. 2 is simplified for the user as compared to conventional graph-based programming techniques.

Figure 3:
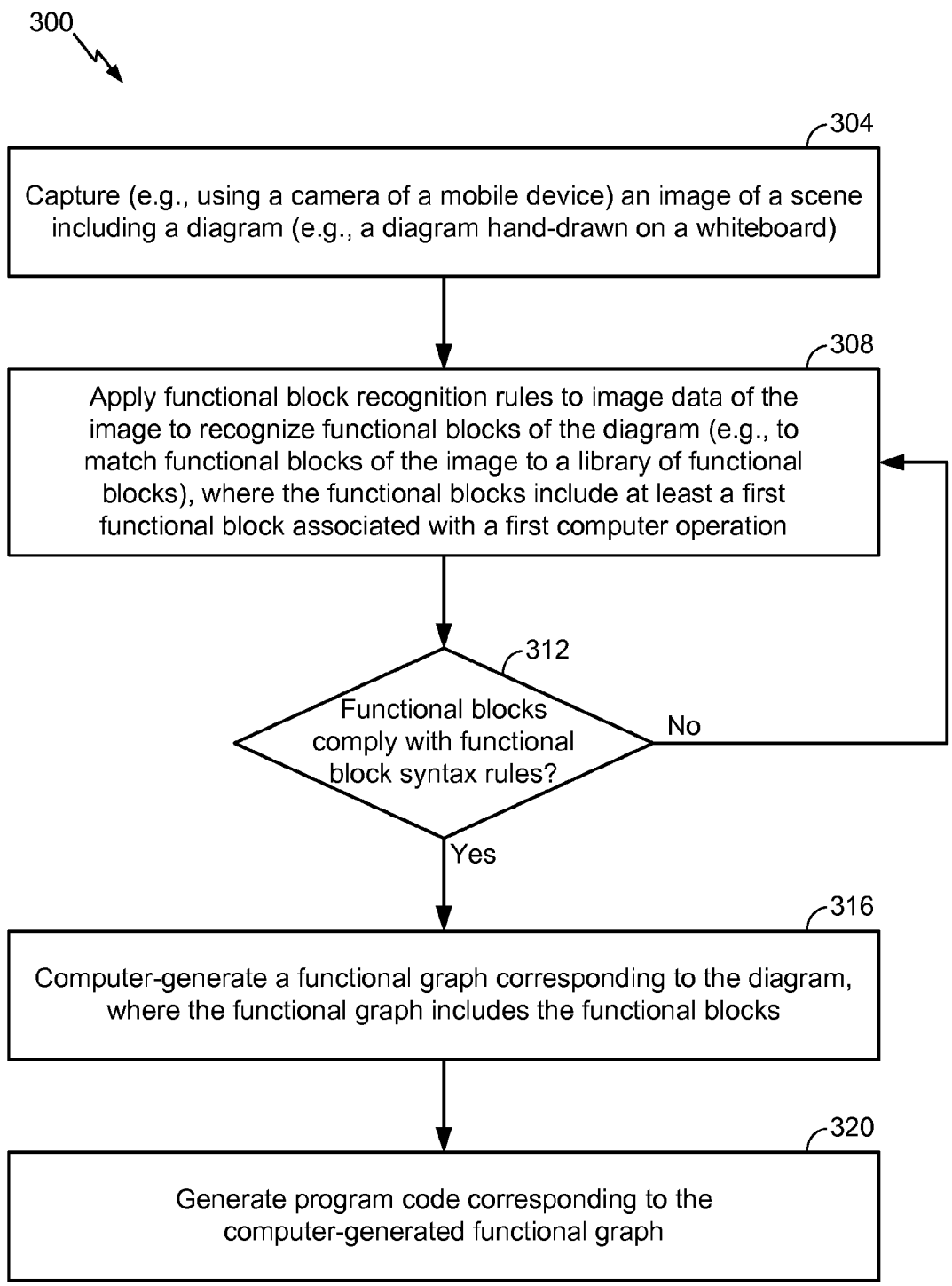
FIG. 3 is a flow chart of a particular illustrative embodiment of a method of constructing a computer-generated functional graph.

Referring to FIG. 3, a particular illustrative embodiment of a method is depicted and generally designated 300. The method 300 includes capturing, at 304, an image of a scene including a diagram. The image, the scene, and the diagram may correspond to the image 116, the scene 104, and the diagram 112, respectively. Further, the diagram may be hand-drawn on a whiteboard, such as the whiteboard 108. In a particular embodiment, the image is captured using a camera of a mobile device.

The method 300 may include applying functional block recognition rules to image data of the image to recognize functional blocks of the diagram, at 308. The functional block recognition rules may correspond to the functional block recognition rules described with reference to the graph lexicon database and syntax rules 128. Applying the functional block recognition rules may include matching functional blocks of the image to a library of functional blocks. The library of functional blocks may correspond to the finite set of predetermined functional blocks 212. The functional blocks include at least a first functional block associated with a first computer operation. As an illustrative example, the first functional block may correspond to any of the functional blocks described herein, such as a denoising functional block or a scaling functional block. The first computer operation may correspond to any of the computer operations described herein, such as a denoising computer operation or a scaling computer operation. Alternatively or in addition, the first functional block and the first computer operation may correspond to one or more other functional blocks and computer operations.

A determination may be made whether the functional blocks comply with functional block syntax rules, at 312. If the functional blocks do not comply with the functional block syntax rules, then the functional block recognition rules may be re-applied to the image data, at 308. For example, a portion of the diagram may be re-analyzed to determine if an error has been made with respect to the portion of the diagram. As a particular example, the functional block recognition rules specify that a first functional block should precede a second functional block. If the recognized functional blocks indicate that the second functional block precedes the first functional block, then a connection between the first functional block and the second functional block may be re-analyzed (e.g., to determine if a direction of an arrow in the diagram should be reversed).

If the functional blocks comply with the functional block syntax rules, a functional graph corresponding to the diagram is computer-generated based on image data corresponding to the image, at 316. For example, the image data may correspond to the image data of the image 116. The computer-generated functional graph may correspond to the computer-generated functional graph 124. In at least one embodiment, the computer-generated functional graph is constructed using a processor of the mobile device.

At 320, program code corresponding to the computer-generated functional graph is generated (e.g., compiled). The program code may correspond to the program code described with reference to FIG. 2 and may be generated using an appropriate technique. According to at least a first technique, the program code is generated at the processor of the mobile device. According to at least a second technique, the program code is generated using a processor of a computer, such as a desktop computer, that is distinct from the mobile device. For example, for large functional graphs including a large amount of data, the mobile device may interface with the computer and may upload data to the computer to enable the computer to generate the program code, conserving processing resources and/or battery life at the mobile device. The program code may be executed at the processor of the mobile device or the program code may be executed at the processor of the computer, as illustrative, non-limiting examples.

Accordingly, the method 300 of FIG. 3 may enable generation of program code corresponding to functional graphs. For example, program code may be generated at a mobile device. Alternatively, the program code may be generated at a computer to conserve processing resources and/or battery life at the mobile device.

Figure 4:
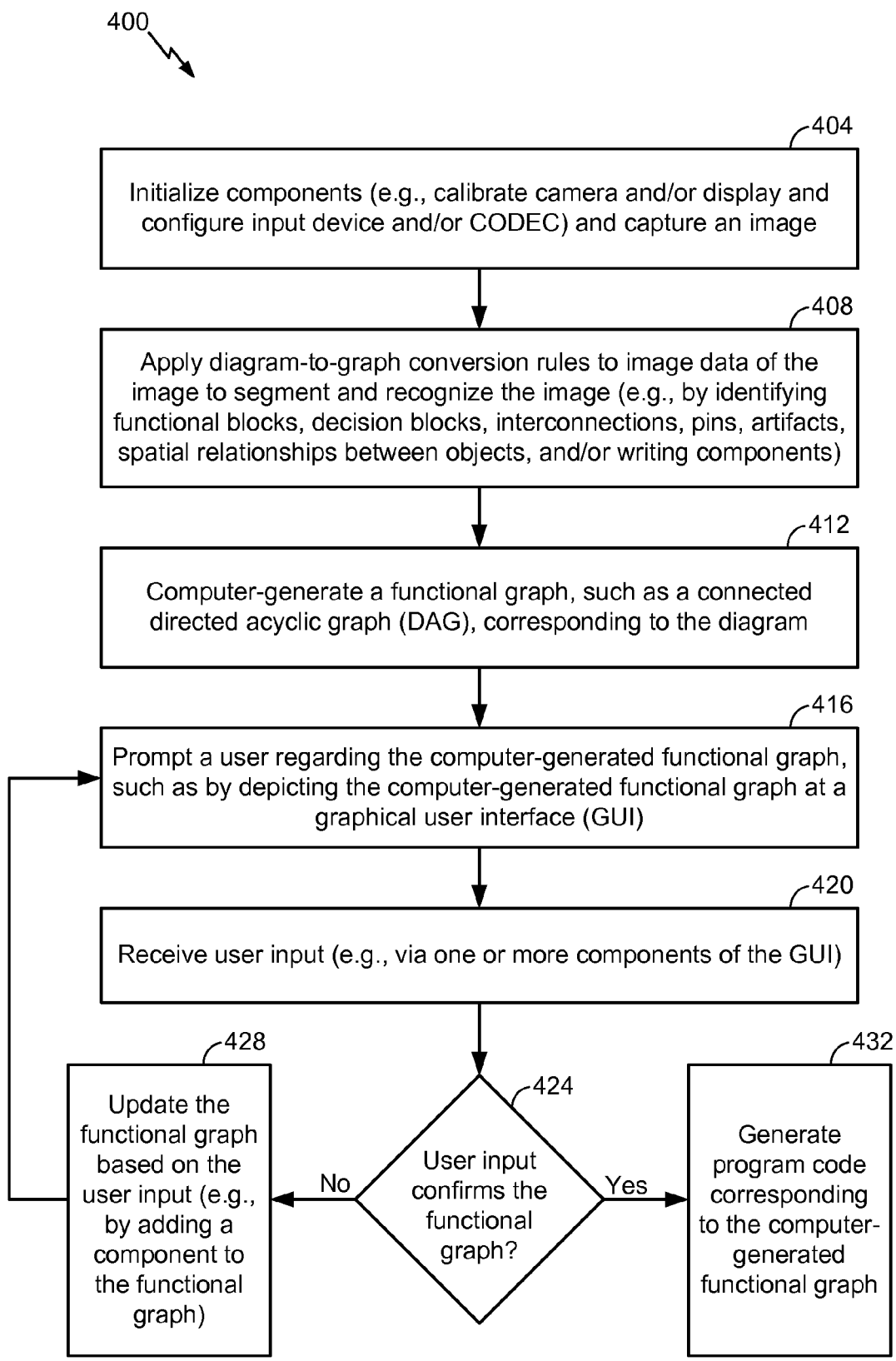
FIG. 4 is a flow chart of another particular illustrative embodiment of a method of constructing a computer-generated functional graph.

Referring to FIG. 4, a particular illustrative embodiment of a method is depicted and generally designated 400. At 404, the method 400 includes initializing components and capturing an image (e.g., the image 116). For example, initializing the components may include calibrating and/or configuring the components, such as components of a mobile device. The components may include a camera, a display, an input device, a coder/decoder (CODEC), a network device, or a combination thereof. As a further example, initializing the components may include adjusting a resolution and/or a frame rate of the camera, calibrating colors of the display, adjusting operation of the CODEC, establishing a network session through an Institute of Electrical and Electronics Engineers (IEEE) 802.11-type wireless connection (e.g., a wireless fidelity (Wi-Fi) connection), or a combination thereof. Initializing the components may include one or more additional techniques, such as pre-processing the image (e.g., color segmentation of the image, histogram mapping of the image, binarization of the image, cropping of the image, or a combination thereof). For example, non-diagram portions of the image may be cropped out.

At 408, diagram-to-graph conversion rules are applied to image data of the image to segment and recognize the image content. The image data may correspond to the image data of the image 116. The diagram-to-graph conversion rules may correspond to the diagram-to-graph conversion rules described with reference to FIG. 2. For example, applying the diagram-to-graph conversion rules to the image data may include identifying functional blocks, decision blocks, interconnections, pins, or a combination thereof, using rules for identifying properties (e.g., dimensions) and other diagram features, such as described with reference to FIGS. 1A, 1B, 1C and 2. In addition, the diagram-to-graph conversion rules may be applied to recognize "artifacts," such as noise or other unwanted information, in the image data. Applying the diagram-to-graph conversion rules may include labeling image objects and creating a property list for each image object. As an example, a decision block may be identified and a property list for the decision block may be created. The property list may indicate properties of the decision block, such as that the decision block is connected to a particular functional block within the diagram.

Applying the diagram-to-graph conversion rules may include identifying spatial relationships between objects of the diagram, such as by applying the graph interconnection rules described with reference to FIG. 2. Further, applying the diagram-to-graph conversion rules may include recognizing writing components, such as by applying the linguistic rules (e.g., lexicon and syntax rules) described with reference to FIG. 2. As a particular example, the diagram 112 includes writing components, such as "wavelet denoising." Applying the diagram-to-graph rules may include associating the recognized writing components with corresponding graph components.

At 412, a functional graph is computer-generated. The computer-generated functional graph corresponds to the diagram. The computer-generated functional graph may correspond to the computer-generated functional graph 124. In a particular embodiment, the computer-generated functional graph corresponds to an acyclic graph, such as a connected directed acyclic graph (DAG). According to further embodiments, the computer-generated functional graph may correspond to other types of graphs. Computer-generating the functional graph may include constructing an adjacency list and/or an adjacency matrix data structure to implement one or more graph processing routines. The adjacency list may indicate relationships of graph components (e.g., adjacencies of the graph components). Computer-generating the functional graph may include confirming that the recognized graph components form a connected DAG.

At 416, the method 400 further includes prompting a user regarding the computer-generated functional graph. As a particular example, the computer-generated functional graph may be depicted at a graphical user interface (GUI), such as at a GUI presented at a display. Prompting the user may include prompting the user for confirmation of the computer-generated functional graph, prompting the user to modify the computer-generated functional graph (e.g., to add or delete components of the computer-generated functional graph), prompting the user regarding one or more other aspects of the computer-generated functional graph, or a combination thereof.

At 420, user input is received, such as via one or more components of the GUI. For example, the user input may result from the user interacting with the GUI. At 424, a decision is made regarding whether the user input confirms the computer-generated functional graph. If the user input does not confirm the computer-generated functional graph, then the method 400 may include updating the computer-generated functional graph based on the user input, at 428. For example, the computer-generated functional graph may be updated by adding or deleting one or more components (e.g., a node, an interconnection, etc.) from the computer-generated functional graph. The method 400 may further include re-prompting the user regarding the updated computer-generated functional graph. Further, the updated computer-generated functional graph may be verified by confirming that the graph components form a connected DAG.

If the user input confirms the computer-generated functional graph, then the method 400 may include generating program code corresponding to the computer-generated functional graph, at 432. As generally described with reference to FIG. 3, the program code may be generated at a mobile device, such as at a mobile device including a camera that captured the image, or the program code may be generated by a computer (e.g., to conserve battery life and/or processing resources at the mobile device).

In a particular embodiment, the program code is generated based on an availability of hardware resources at the device that is to execute the program code (e.g., the mobile device or the computer). For example, the program code may be "optimized" based on a number of processing units that are available to execute the program code. The hardware resources may include one or more central processing units (CPUs), one or more graphics processing units (GPUs), one or more digital signal processors (DSPs), one or more field-programmable gate arrays (FPGAs), one or more application-specific integrated circuits (ASICs), one or more physical memory devices (e.g., a main memory), one or more interconnections (e.g., a bus), or a combination thereof.

The method 400 may further include prompting the user to redraw the diagram (not shown in FIG. 4). For example, if application of the diagram-to-graph conversion rules to the image data indicates that no graph can be recognized from the diagram (e.g., due to skewed lines and/or overlapping shapes), the method 400 may include prompting the user to redraw the diagram (e.g., using approximately horizontal lines and/or non-overlapping shapes) and to capture a second image of the redrawn diagram.

The method 400 may further include saving the program code. For example, the method 400 may include prompting the user to indicate whether the program code is to be saved (e.g., saved at the database described with reference to FIG. 2). In a particular embodiment, the program code is saved as a particular functional block (e.g., as a "macro" functional block) of the database of FIG. 2. Saving the program code as a macro functional block may enable the program code to be used in another functional block diagram (e.g., by selecting the macro functional block and inserting the macro functional block in the functional block diagram). Accordingly, saving the program code in such a manner may enable users to avoid duplication of the program code, which may facilitate compact and efficient generation of additional functional block diagrams.

In at least one embodiment, the diagram-to-graph conversion rules are calibrated by the user. For example, the user may configure parameter settings for particular functions. To illustrate, the user may adjust a parameter for a scaling function by changing a value of the parameter from two to four. Applying the diagram-to-graph conversion rules may include recognizing one or more colors of the image. For example, particular colors may be designated to indicate certain graph components, operations, or a combination thereof. In a particular embodiment, such color designations may be calibrated by the user.

To illustrate, a green color may indicate the result of a positive determination. For example, a green interconnection from the functional block 242 to the functional block 244 may indicate that "B" corresponds to a positive determination (e.g., a determination that a condition is satisfied) at the functional block 242. As another example, a red color may indicate the result of a negative determination (e.g., a determination that a condition is not satisfied). For example, if the interconnection 250 is red, then "A" may correspond to a negative determination at the functional block 242. Such colors may be calibrated by the user.

The method 400 may facilitate simplified generation of program code based on an image of a diagram. In particular, by applying the diagram-to-graph conversion rules to construct the computer-generated functional graph and by prompting the user to confirm the computer-generated functional graph, less input may be required from the user as compared to conventional techniques in which the user manually enters information regarding each portion of the computer-generated functional graph. Further, because users often prefer to draw a diagram to explain a process (e.g., while explaining the process to colleagues), capturing an image of the diagram is often convenient for the user. Therefore, computer-generation of functional graphs according to the techniques of FIG. 4 may enable greater workplace efficiency by freeing the user to perform other tasks.

As used herein, "program code" may include instructions that are computer-readable and computer-usable. Program code may include instructions that are executable by a computer, such as architecturally-defined instructions (e.g., machine instructions). Depending on the particular application, machine instructions may include instructions that have been compiled from source code of a high-level programming language, such as C, C++, C#, or another compiled computing language, as well as machine instructions that are generated from a low-level programming language, such as machine instructions generated from assembly language instructions. Program code may include instructions in a "pre-compiled" or other non-executable state, such as source code instructions that are to be compiled by a compiler of a computer prior to run-time and assembly language instructions that are to be assembled by an assembler prior to run-time. Program code may include instructions that are interpreted by an interpreter of a computer (e.g., at run-time), such as Python computing language instructions, Ruby computing language instructions, or instructions of another interpreted computing language.

Figure 5:
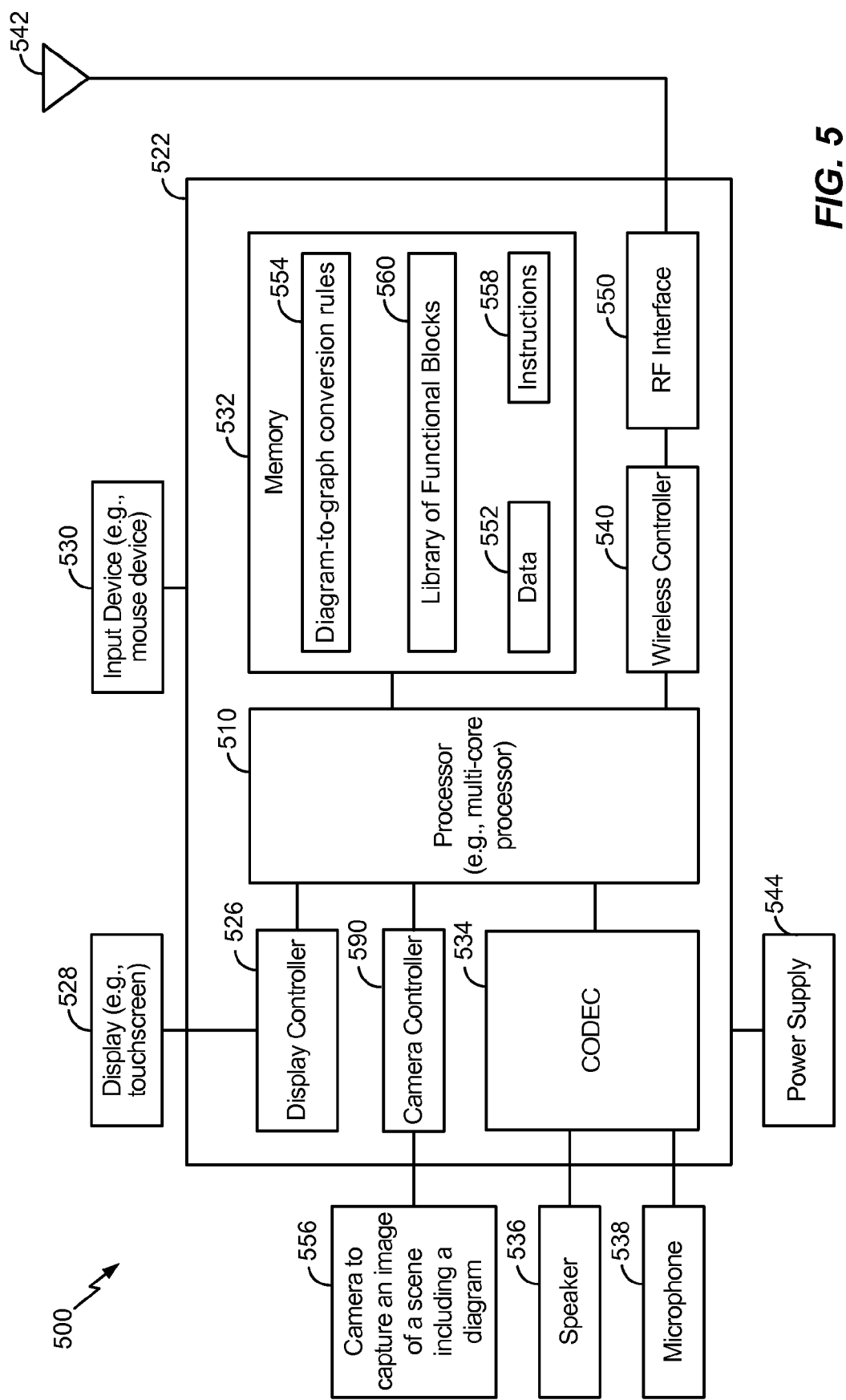
FIG. 5 is a block diagram of a mobile device configured to construct a computer-generated functional graph.

Referring to FIG. 5, a block diagram of a particular illustrative embodiment of a mobile device is depicted and generally designated 500. The mobile device 500 may include a processor 510, such as a multi-core processor. The processor 510 may be coupled to a computer-readable medium, such as to a memory 532 (e.g., a non-transitory computer-readable medium). The memory 532 may store diagram-to-graph conversion rules 554 accessible to the processor 510, a library of functional blocks 560 accessible to the processor 510, instructions 558 executable by the processor 510, and data 552 usable by the processor 510. The diagram-to-graph conversion rules 554 and the memory 532 may correspond to the diagram-to-graph conversion rules and the database of FIG. 2, respectively.

The diagram-to-graph conversion rules 554 may include graph topology rules, graph interconnection rules, linguistic rules, or a combination thereof. The diagram-to-graph conversion rules 554 may be customized for recognizing diagrams on a whiteboard, such as the whiteboard 108. For example, color recognition rules of the diagram-to-graph conversion rules 554 may be customized for recognizing typical whiteboard marker colors (e.g., blue and red) upon a white surface. The color recognition rules may account for an amount of light reflection (e.g., glare) that is typically caused by a white surface of a whiteboard. The library of functional blocks 560 may correspond to the finite set of predetermined functional blocks 212. In a particular illustrative embodiment, the library of functional blocks 560 is a "constrained" library of information that is customized for recognition of a certain category of functional blocks. For example, the library of functional blocks 560 may be "constrained" to recognize functional blocks associated with computer vision operations.

FIG. 5 also shows a display controller 526 that is coupled to the processor 510 and to a display 528. The display 528 may be configured to display the graphical user interface (GUI) described with reference to FIG. 4. A coder/decoder (CO- DEC) 534 can also be coupled to the processor 510. A speaker 536 and a microphone 538 can be coupled to the CODEC 534. The mobile device 500 may include a camera having an image sensor, such as a charge-coupled device (CCD) image sensor or a complementary metal-oxide-semiconductor (CMOS) image sensor. For example, FIG. 5 depicts that a camera 556 may be coupled to a camera controller 590. The camera controller 590 may be coupled to the processor 510. The camera 556 is configured to capture an image of a scene including a diagram, which may correspond to the image 116, the scene 104, and the diagram 112, respectively. FIG. 5 also indicates that a wireless controller 540 can be coupled to the processor 510. The wireless controller 540 may be further coupled to an antenna 542 via a radio frequency (RF) interface 550.

In a particular embodiment, the processor 510, the memory 532, the display controller 526, the camera controller 590, the CODEC 534, the wireless controller 540, and the RF interface 550 are included in a system-in-package or system-on-chip device 522. An input device 530 and a power supply 544 may be coupled to the system-on-chip device 522. The input device 530 may be configured to receive input from a user regarding a computer-generated functional graph, such as input confirming or modifying the computer-generated functional graph, as described with reference to FIG. 4.

Moreover, in a particular embodiment, and as illustrated in FIG. 5, the display 528, the input device 530, the camera 556, the speaker 536, the microphone 538, the antenna 542, and the power supply 544 are external to the system-on-chip device 522. However, each of the display 528, the input device 530, the camera 556, the speaker 536, the microphone 538, the antenna 542, and the power supply 544 can be coupled to a component of the system-on-chip device 522, such as to an interface or to a controller.

In at least one embodiment, the antenna 542, the RF interface 550, and the wireless controller 540 are configured to interface with a computer. For example, the antenna 542, the RF interface 550, and the wireless controller 540 may be configured to transmit data corresponding to a computer-generated functional graph to the computer to enable the computer to generate program code based on the data. According to further embodiments, the mobile device 500 may be configured to interface with the computer via another interface (e.g., a wired interface, such as a universal serial bus (USB) interface).

In at least one embodiment, the program code is computer-generated based on a particular hardware platform at which the program code is to be executed. The particular hardware platform may be associated with a particular configuration of hardware resources, such as a number of central processing units (CPUs), graphics processing units (GPUs), digital signal processors (DSPs) vector processors, scalar processors, other chips, an amount of random access memory (RAM), or a combination thereof. For example, if the program code is to be executed at the processor 510, the program code may be generated based on whether the processor 510 includes parallel processing functionality (e.g., multiple processing cores). If the processor 510 includes parallel processing functionality, then the program code may indicate multiple operations to be performed in parallel by the processor 510. As another example, if the program code is to be executed by another device (e.g., a desktop computer), then the program code may be generated based on a particular hardware platform of the computer device. Further, the program code may be generated based on a "deployment graph" that corresponds to the particular hardware platform upon which the program code is to be executed, as described further with reference to FIG. 10.

Figure 6:
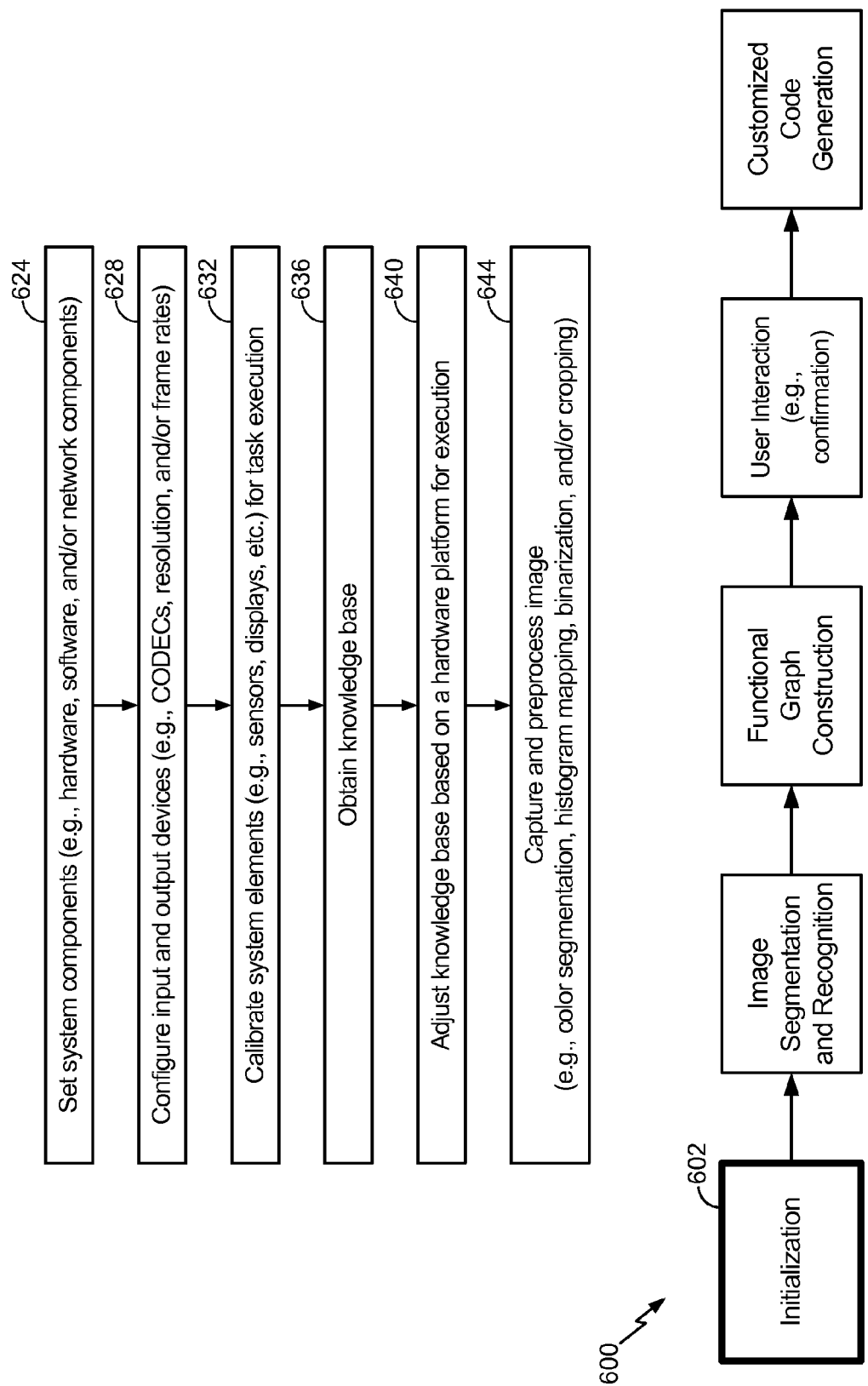
FIG. 6 illustrates operations for computer-generating a functional graph including certain initialization operations.

Referring to FIG. 6, particular example operations for computer-generating a functional graph are depicted and generally designated 600. The operations 600 may be performed by one or more processing devices, such as the processor 208, the processor 510, another processor, or a combination thereof.

The operations 600 may include initializing components and capturing an image (e.g., the image 116), at 602. For example, initializing the components may include setting system hardware, software, and or network components, such as components of the mobile device 500, at 624.

Input and output devices may be configured, at 628. The input and output devices may include the camera 556, the display 528, the input device, the CODEC 534, or a combination thereof. As a particular illustrative example, a resolution, a frame rate, and/or a CODEC associated with the camera 556 may be configured.

Initializing the components may further include calibrating system elements for task execution, at 632, such as by calibrating colors of the display 528, adjusting operation of one or more sensors of the camera 556, or a combination thereof. Initializing the components may include obtaining a knowledge base, at 636. The knowledge base may correspond to the graph lexicon database and syntax rules 128, the finite set of predetermined functional blocks 212, the diagram-to-graph conversion rules 554, the library of functional blocks 560, or a combination thereof.

The knowledge base may be adjusted based on a hardware platform for execution, at 640. In a particular embodiment, the knowledge base is adjusted based on an availability of hardware resources at a device that is to execute program code that is generated using the operations 600. For example, the program code may be "optimized" based on a number of processing units of the hardware platform that are available to execute the program code. The processing units may include one or more central processing units (CPUs), one or more graphics processing units (GPUs), one or more digital signal processors (DSPs), one or more field-programmable gate arrays (FPGAs), one or more application-specific integrated circuits (ASICs), one or more physical memory devices (e.g., a main memory), one or more interconnections (e.g., a bus), or a combination thereof. In a particular illustrative embodiment, the hardware platform is distinct from the one or more processing devices that perform the operations 600. To illustrate, although the mobile device 500 may perform the operations 600, another device (e.g., a desktop computer) may execute code that is generated using the operations 600, as explained further below.

Initializing the components and capturing the image may include capturing and pre-processing the image, at 644. As a particular example, the image may be captured using the camera 556. The image may be captured of the scene 104, the diagram 202, or a combination thereof. Pre-processing the image may include performing one or more color segmentation operations of the image, performing histogram mapping of the image, performing binarization of the image, performing cropping of the image, or a combination thereof. For example, non-diagram portions (e.g., "noise" or other artifacts) of the image may be cropped out.

Figure 7:
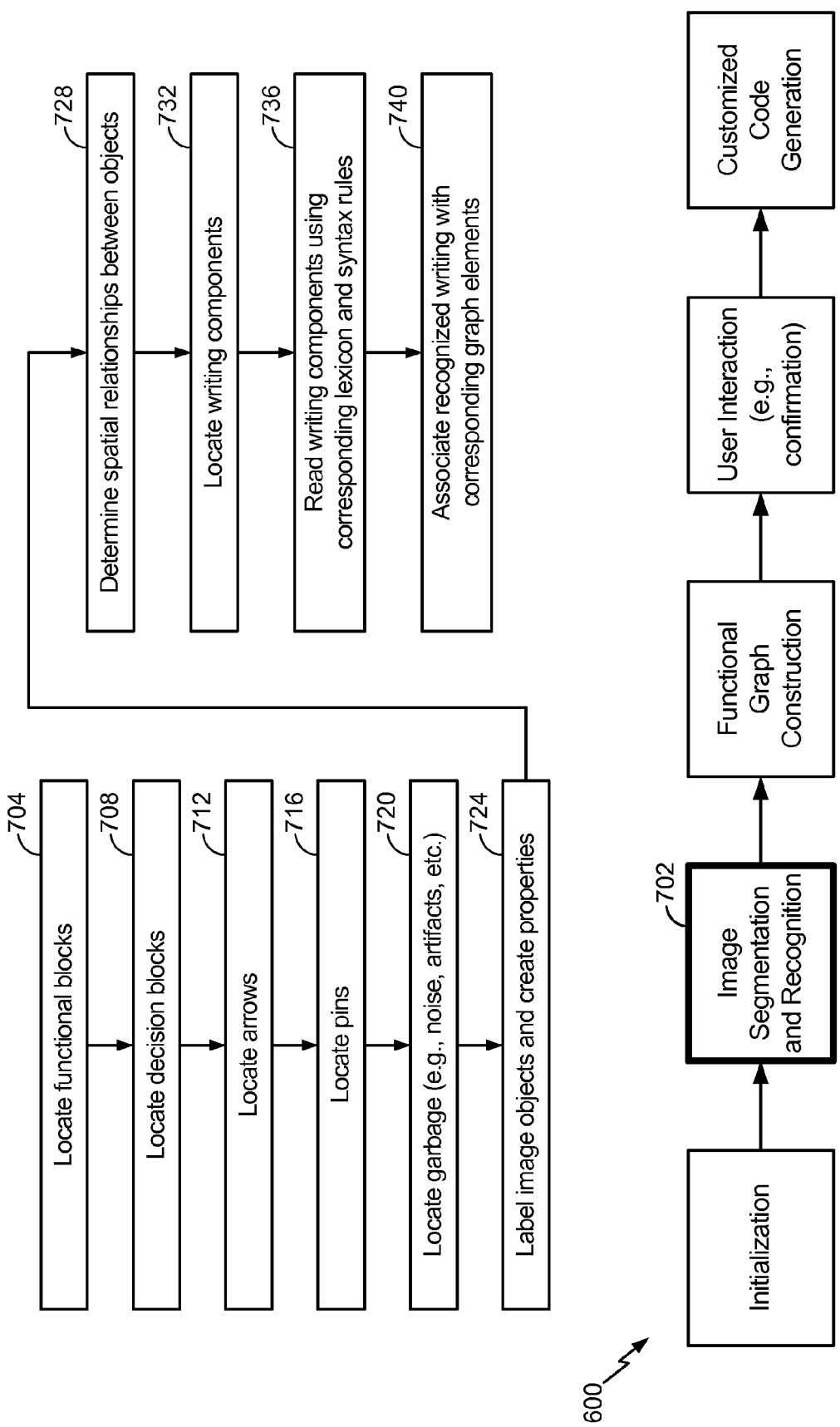
FIG. 7 illustrates certain segmentation and recognition operations of the operations of FIG. 6.

FIG. 7 illustrates additional examples of the operations 600. In FIG. 7, the operations 600 further include performing image segmentation and recognition of the image, at 702. The image segmentation and recognition may include locating functional blocks of the image, at 704, and locating decision blocks, at 708. For example, the finite set of predetermined functional blocks 212 and/or the library of functional blocks 560 may be applied to image data of the image to "match" functional blocks of the image. The functional blocks may include the functional blocks 220, 224, 228, and 236. The decision blocks may include the functional block 232.

The image segmentation and recognition may include locating arrows (e.g., interconnections), at 712, and locating pins at 716. The arrows may include the interconnection 250. The pins may include the pins 246, 248. The image segmentation and recognition may include locating garbage (e.g., noise, artifacts, etc.), at 720, and labeling image objects and creating image properties, at 724, such as by creating a property list for each image object. As an example, a decision block may be identified and a property list for the decision block may be created. The property list may indicate properties of the decision block, such as that the decision block is connected to a particular functional block within the diagram.

The image segmentation and recognition may include identifying spatial relationships between objects of the diagram, at 728, such as by applying the graph interconnection rules described with reference to FIG. 1C. Further, the image segmentation and recognition may include locating writing components, at 732, such as by applying the linguistic rules (e.g., lexicon and syntax rules) described with reference to FIG. 1C. As a particular example, the diagram 112 includes writing components, such as "wavelet denoising." The image segmentation and recognition may include reading the writing components using corresponding lexicon and syntax rules, at 736, and associating the recognized writing components with corresponding graph elements, at 740. The lexicon and syntax rules may be included in the graph lexicon database and syntax rules 128.

Figure 8:
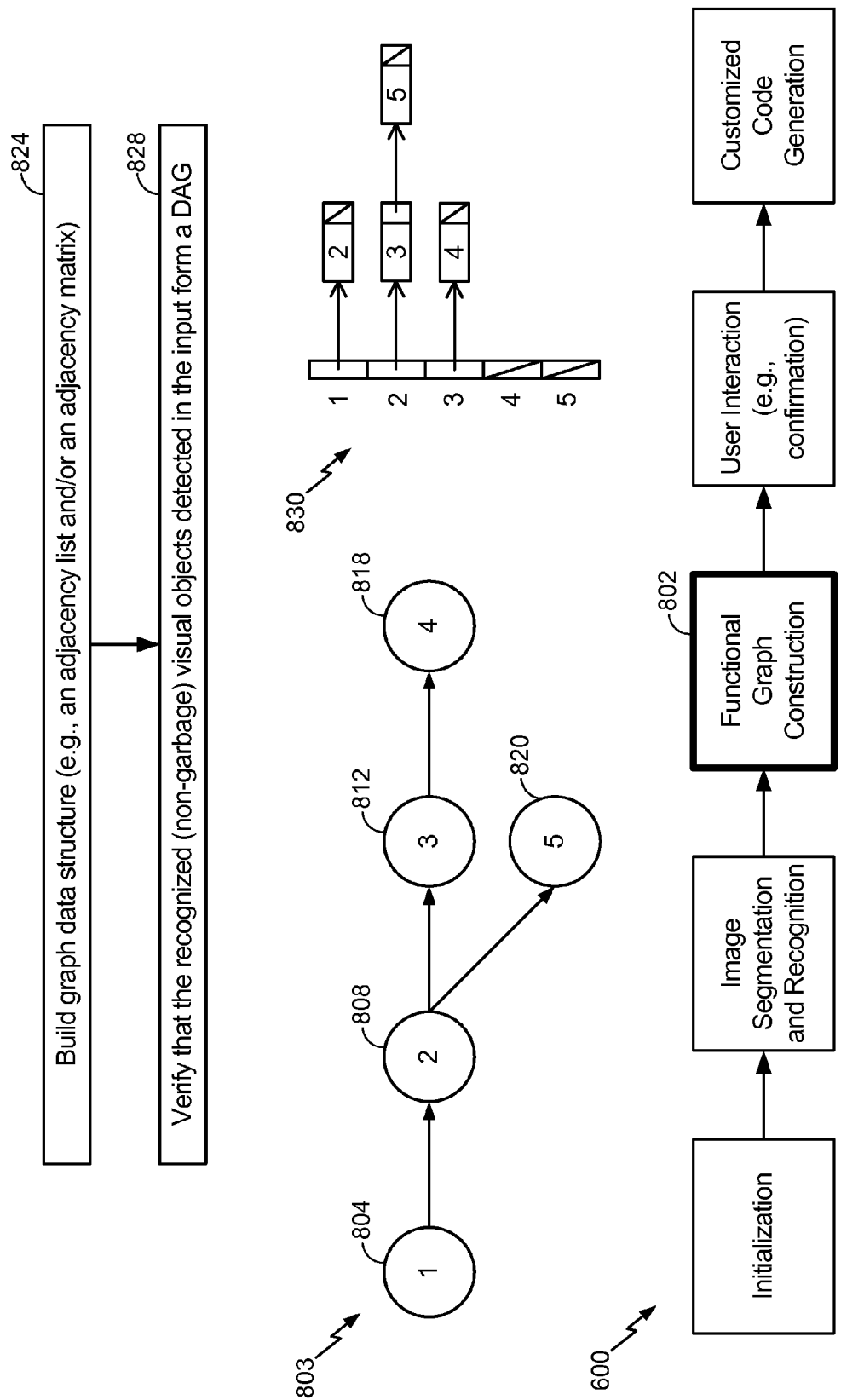
FIG. 8 illustrates certain functional graph construction operations of the operations of FIG. 6.

FIG. 8 illustrates additional examples of the operations 600. In FIG. 8, the operations 600 further include computer-generating a functional graph (e.g., a functional graph 803), at 802. The functional graph 803 may correspond to any of the functional graphs described above, such as the computer-generated functional graph 124, the computer-generated functional graph 216, or a combination thereof. The functional graph 803 may be computer-generated based on image data of the image, such as based on the image data of the image 116. The functional graph 803 may correspond to the diagram 112 (or to a portion of the diagram 112). The functional graph 803 may include one or more nodes, such as a first node 804, a second node 808, a third node 812, a fourth node 818, and a fifth node 820.

Computer-generating the functional graph 803 may include building a graph data structure, at 824. The graph data structure may correspond to an adjacency list, such as an adjacency matrix data structure 830. The adjacency matrix data structure 830 may implement one or more graph processing routines and may indicate relationships of graph components (e.g., adjacencies of the graph components). To illustrate, in the particular example of FIG. 8, the adjacency matrix data structure 830 indicates that the second node 808 is adjacent to the first node 804, that the third node 812 is adjacent to the second node 808 and to the fifth node 820, and that the fourth node 818 is adjacent to the third node 812.

Computer-generating the functional graph 803 may include verifying that recognized (non-garbage) visual objects in the input form a directed acyclic graph (DAG), at 828. For example, a "check" may be performed to confirm that the recognized graph components form an acyclic graph, such as a connected directed acyclic graph (DAG). According to further embodiments, the functional graph 803 may correspond to another type of graph.

Figure 9:
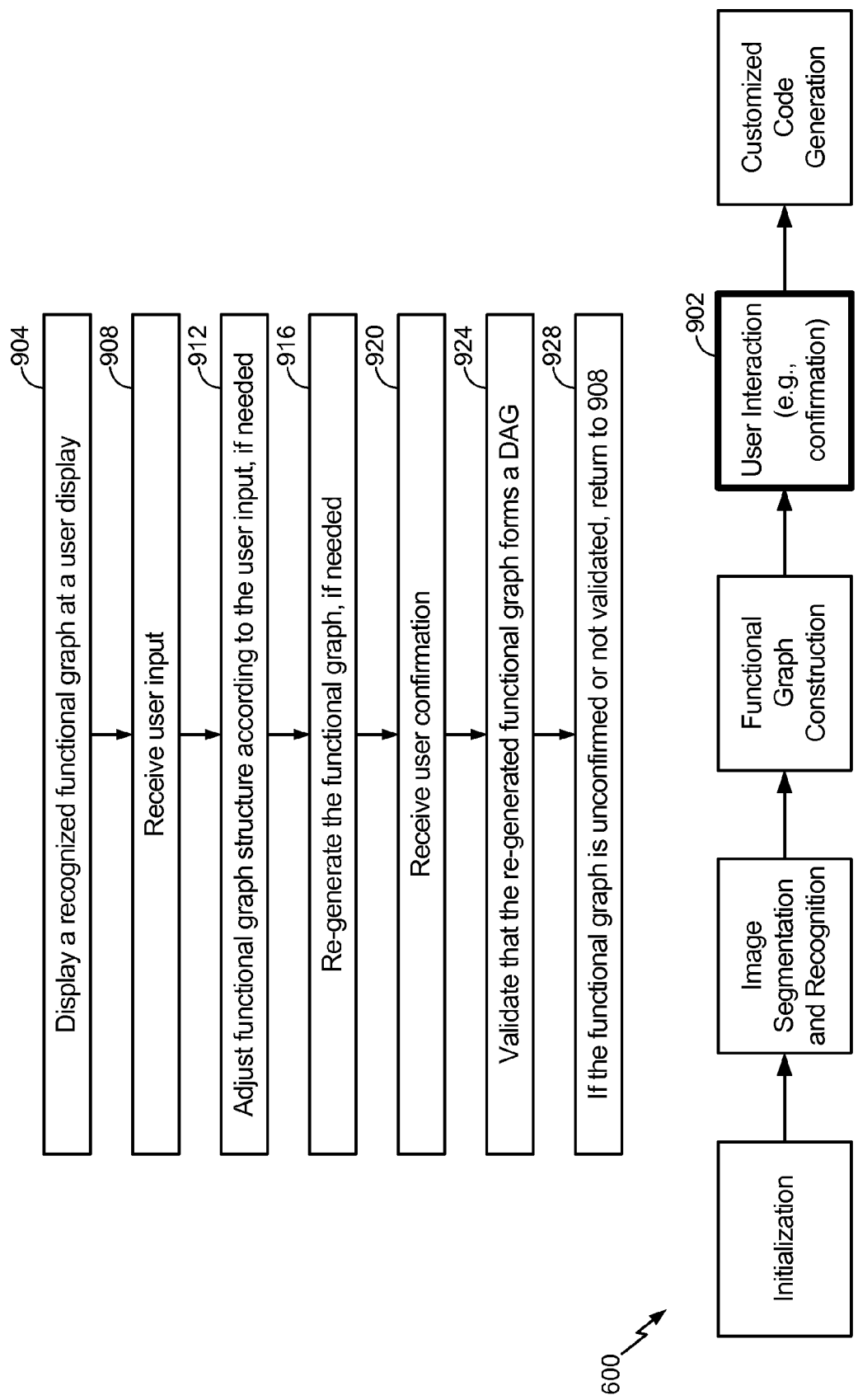
FIG. 9 illustrates certain user interaction operations of the operations of FIG. 6.

FIG. 9 illustrates additional examples of the operations 600. In FIG. 9, the operations 600 further include receiving user interaction (e.g., confirmation), at 902. For example, receiving the user interaction may include displaying a recognized functional graph, such as the recognized DAG described with reference to FIG. 8, at a user display (e.g., the display 528), at 904. As a particular example, the computer-generated functional graph may be depicted at a graphical user interface (GUI), such as at a GUI presented at a display.

User input may be received, at 908, such as via one or more components of the GUI. For example, the user input may result from the user interacting with the GUI.

The user may be prompted regarding the recognized functional graph. Prompting the user may include prompting the user for confirmation of the recognized functional graph, prompting the user to modify the recognized functional graph (e.g., to add or delete components of the recognized graph), prompting the user regarding one or more other aspects of the recognized functional graph, or a combination thereof. The recognized functional graph may be adjusted according to the user input, at 912, and re-generated, at 916 (if applicable based on the user input). User confirmation may be received based on the re-generated recognized functional graph, at 920.

The re-generated recognized functional graph may be validated to ensure that the re-generated functional graph forms a DAG, at 924. If the re-generated functional graph does not form a DAG, then operation may continue, at 908. If the re-generated functional graph forms a DAG, then operation may continue, at FIG. 10.

Figure 10:
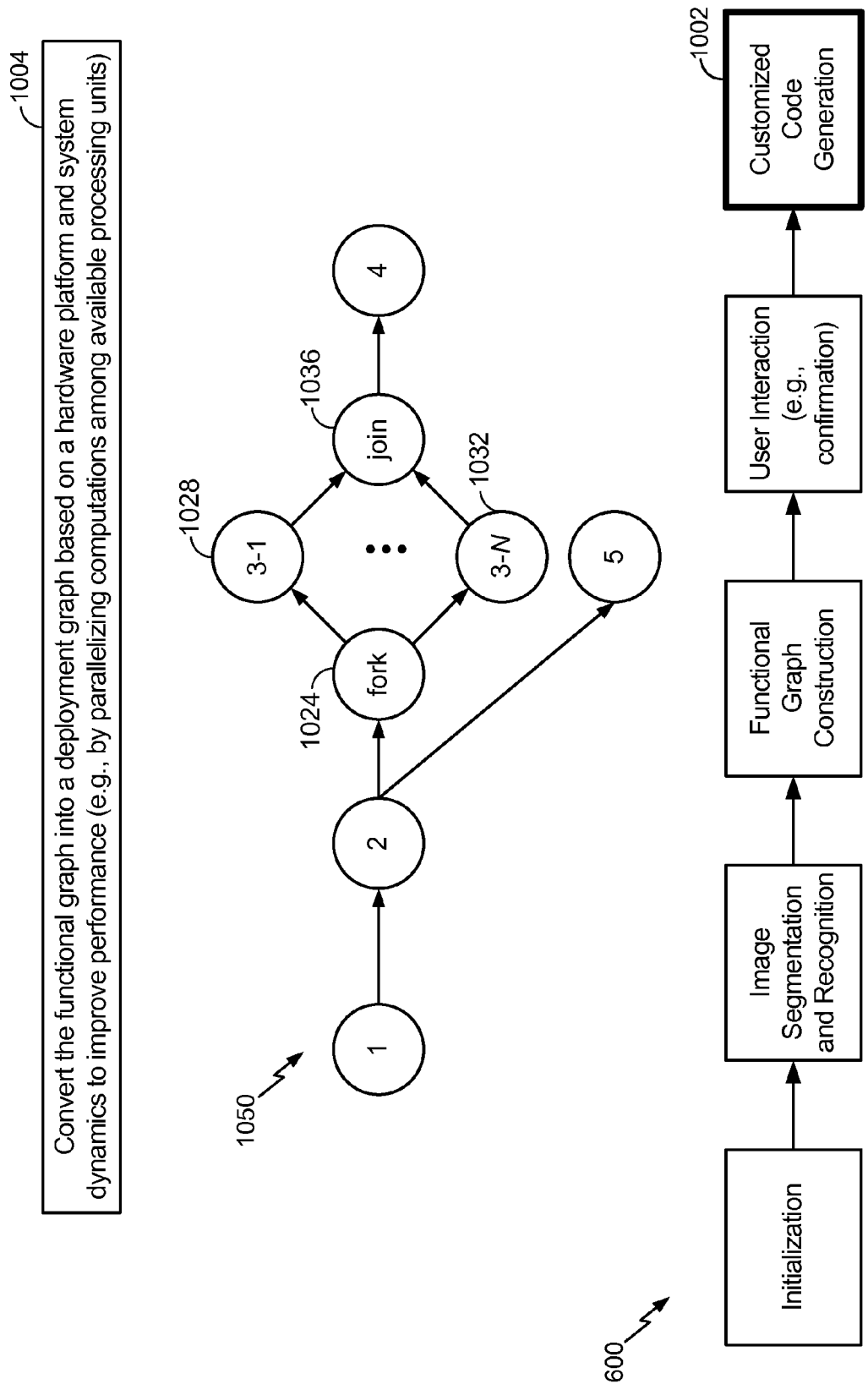
FIG. 10 illustrates an example customized code generation operation of the operations of FIG. 6.

FIG. 10 illustrates additional examples of the operations 600. In FIG. 10, the operations 600 further include generating customized code, at 1002. Generating the customized code may include converting the functional graph into a deployment graph, such as a deployment graph 1050, at 1004.

The deployment graph 1050 is generated based on the functional graph 803 and is further based on a particular hardware platform (e.g., number and type of processing resources) and system dynamics (e.g., availability of processing resources) of a device that is to execute the customized code. As a particular example, the deployment graph 1050 may be generated based on a number of processor cores of the processor 510 of the mobile device 500, or of another device.

To further illustrate, FIG. 10 indicates that the deployment graph 1050 includes a forking node 1024, a plurality of parallel nodes (illustrated in FIG. 10 as a first parallel node 1028 and an Nth parallel node 1032), and a joining node 1036 that are each based on the third node 812 of the functional graph 803. In a particular embodiment, the deployment graph 1050 is generated in response to determining (e.g., by the processor 510 of FIG. 5) that a task corresponding to the third node 812 can be "distributed" (e.g., parallelized) across N cores of a multi-core processor that is to execute the customized code (where N is an integer greater than one). Determining whether the task corresponding to the third node 812 can be distributed may be performed based on the diagram-to-graph conversion rules 554 of FIG. 5. That is, the diagram-to-graph conversion rules 554 of FIG. 5 may indicate types of tasks that can be distributed. A user may be prompted to confirm the deployment graph 1050, such as in accordance with one or more techniques described with reference to FIG. 4. According to further embodiments, the user is not prompted to confirm the deployment graph 1050. The conversion of the functional graph 803 to the deployment graph 1050 may improve performance by parallelizing computations among available processing units.

Figure 11:
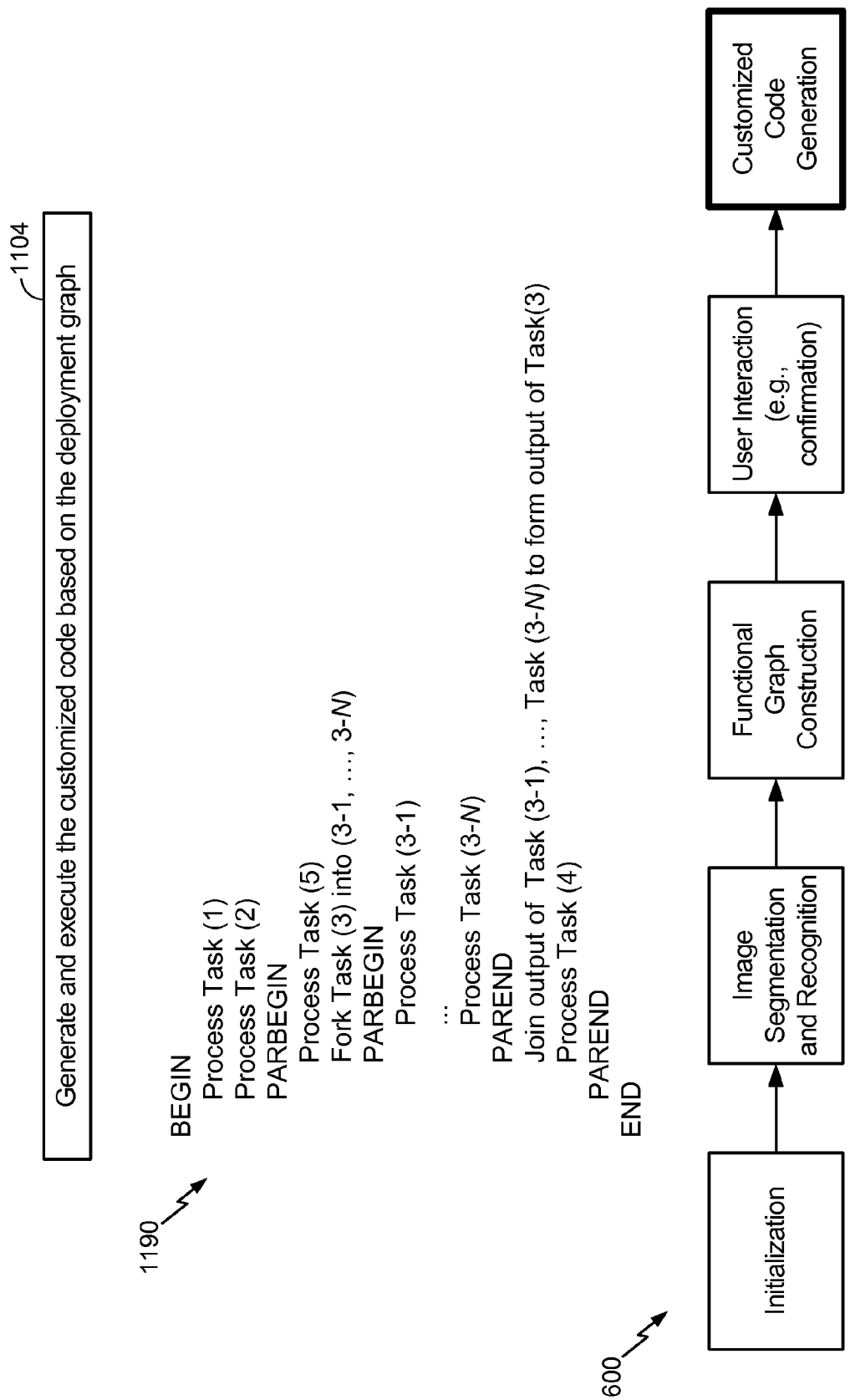
FIG. 11 illustrates another example customized code generation operation of the operations of FIG. 6.

FIG. 11 illustrates additional examples of the operations 600. In FIG. 11, generating the customized code further includes generating and executing the customized code, such as program code corresponding to pseudo-code 1190, based on the deployment graph 1050, at 1104. The program code corresponding to the pseudo-code 1190 may be generated based on the deployment graph 1050. For example, the pseudo-code 1190 indicates that a task corresponding to the third node 812 (i.e., task 3) may be forked into tasks corresponding to the parallel nodes 1028 and 1032 (i.e., tasks 3-1 . . . 3-N). The tasks 3-1 . . . 3-N may be performed in parallel (e.g., at a multi-core processor). The pseudo-code 1190 further indicates that outputs of the tasks 3-1 . . . 3-N may be joined to form an output of task 3. Therefore, the pseudo-code 1190 corresponds to the deployment graph 1050.

Because program code is generated based on the deployment graph 1050, the program code is suited for execution on a particular hardware platform. For example, because the deployment graph 1050 includes N parallel nodes based on a multi-core processor having N processing cores, the program code may be tailored for the particular hardware platform. Accordingly, performance may be enhanced as compared to "generic" program code that is not customized for the particular hardware platform. Although FIG. 6 depicts pseudo-code 1190 for convenience instead of executable instructions, it should be appreciated that other program code (e.g., executable instructions) may be generated based on the deployment graph 1050 (e.g., by compiling source code corresponding to the deployment graph 1050 to generate executable instructions).

In connection with the described embodiments, a computer-readable medium (e.g., the memory 532) stores instructions (e.g., the instructions 558) that are executable by a processor (e.g., the processor 510) to perform one or more operations described herein. The operations may include capturing image data corresponding to an image (e.g., the image 116) of a scene (e.g., the scene 104) including a diagram (e.g., the diagram 112). The operations may further include applying functional block recognition rules to the image data to recognize functional blocks of the diagram and determining whether the functional blocks comply with functional block syntax rules. The operations may further include computer-generating a functional graph corresponding to the diagram based on the functional blocks complying with the functional block syntax rules. The functional graph includes the functional blocks. The functional graph may correspond to one or more of the graphs 124, 216, 803, and 1050.

Although various techniques for capturing an image using a camera are described herein, it should be appreciated that images can be obtained using other techniques alternatively or in addition to using a camera. For example, the mobile device 500 of FIG. 5 may correspond to an electronic tablet, and the display 528 may correspond to a touchscreen of the electronic tablet. A user may draw a diagram on the touchscreen (e.g., using fingers and/or a stylus) and may capture an image of the diagram (e.g., by taking a screen capture or "screen shot" of the touchscreen). As another example, the input device 530 may correspond to a mouse device (or another suitable input device) that a user of the mobile device 500 may utilize to draw an image (e.g., at the display 528), such as in connection with an image creation application executed at the mobile device 500.

In connection with the described embodiments, an apparatus includes means for storing (e.g., the memory 532) functional block recognition rules. The apparatus further includes means for applying the functional block recognition rules (e.g., the processor 208 and/or the processor 510) to image data of an image of a scene that includes the diagram to recognize functional blocks of the diagram, for determining whether the functional blocks comply with functional block syntax rules, and for generating a functional graph corresponding to the diagram based on the functional blocks complying with the functional block syntax rules. The functional blocks include at least a first functional block associated with a first computer operation, and the functional graph includes the functional blocks. The functional graph may correspond to one or more of the graphs 124, 216, 803, and 1050.

As used herein, "computer-generated" may refer to graphs and other data that are generated (e.g., constructed) using one or more processing units, such as the processor 510 of FIG. 5. For example, a "computer-generated" functional block diagram may refer to a functional block diagram that is constructed by a processor (e.g., the processor 510 of FIG. 5) based on image data using one or more diagram-to-graph conversion rules (e.g., the diagram-to-graph conversion rules 554 of FIG. 5). Further, one or more operations described herein may be implemented using global data structures, which may be stored at a shared (e.g., main) memory. The diagram-to-graph conversion rules may be specific to the size of a diagram, orientation of the diagram, labeling of components of the diagram, or a combination thereof. For example, a first set of diagram-to-graph conversion rules may be used for a first particular range of diagram sizes, and a second set of diagram-to-graph conversion rules may be used for a second particular range of diagram sizes, since for example diagram features may be more easily recognized for larger diagram sizes (e.g., and may accommodate a more precise range of dimensions as compared to smaller diagram sizes, etc.).

For purposes of illustration, examples of diagram-to-graph conversion rules are provided. Depending on the particular application, some, all, or none of the particular example diagram-to-graph conversion rules may be used. Particular illustrative examples of diagram-to-graph conversion rules include a rule specifying that a graph runs in a context and that a context can have multiple graphs. A rule may specify that a graph has nodes and connections and that a node has pins to interact with other graph components. A rule may specify that a pin is either an input pin or an output pin and that each node has zero or more input pins and zero or more output pins, where the combined sum of input and output pins is greater than or equal to one. A rule may specify that an interconnection connects an input pin to an output pin and that no connection may be made between two input pins or between two output pins. A rule may specify that an output pin may connect to one or more input pins and that an input pin can be connected to only one output pin. A rule may specify that interconnections cannot create a loop among the node(s), unless such loop includes one or more delay nodes. A rule may specify that a node may have zero or more properties that parameterize and configure the node and that a type of a node determines the type and value range of the properties of the node, if any. Accordingly, diagram-to-graph conversion rules may be applied to image data to computer-generate a functional graph, such as the computer-generated functional graph 124.

Those of skill in the art will appreciate that the foregoing disclosed devices and functionalities may be designed and configured into computer files (e.g., RTL, GDSII, GERBER, etc.) stored on computer-readable media. Some or all such files may be provided to fabrication handlers who fabricate devices based on such files. Resulting products include semiconductor wafers that are separated into semiconductor dies and packaged into semiconductor chips. The semiconductor chips are then employed within devices, such as within the mobile device 500 of FIG. 5.

Those of skill would further appreciate that the various illustrative logical blocks, configurations, modules, circuits, and algorithm steps described in connection with the embodiments disclosed herein may be implemented as electronic hardware, computer software, or combinations of both. Various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of storage medium known in the art. An exemplary non-transitory medium is coupled to the processor such that the processor can read information from, and write information to, the storage medium. In the alternative, the storage medium may be integral to the processor. The processor and the storage medium may reside in an application-specific integrated circuit (ASIC) and/or a field programmable gate array (FPGA) chip. The ASIC and/or FPGA chip may reside in a computing device or a user terminal. In the alternative, the processor and the storage medium may reside as discrete components in a computing device or user terminal.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. For example, although various operations are described herein with reference to functional block diagrams, those of skill in the art will also recognize that such operations may correspond to deployment graphs alternatively or in addition to functional block diagrams, depending on the particular application. As a particular example, certain user operations described with reference to FIG. 4 (e.g., confirming the functional block diagram) may also be performed with reference to the deployment graph 1050. Alternatively, generation of the deployment graph may be "transparent" to the user. Thus, the present disclosure is not intended to be limited to the embodiments shown herein but is to be accorded the widest scope possible consistent with the principles and novel features as defined by the following claims.

What is claimed is:

1. A method comprising:
   capturing an image of a scene that includes a portion of a diagram representing functional blocks, wherein the functional blocks include at least a first functional block associated with a first computer operation;
   applying functional block recognition rules to image data of the image to recognize the functional blocks;
   determining whether the functional blocks comply with functional block syntax rules, wherein the functional block syntax rules indicate a hierarchy of operations associated with the functional blocks; and
   computer-generating a functional graph corresponding to the diagram based on the functional blocks complying with the functional block syntax rules, wherein the functional graph includes a graphical representation of the functional blocks.

2. The method of claim 1, wherein the functional blocks further include a second functional block associated with a second computer operation, and wherein the syntax rules specify an order of the first computer operation and the second computer operation.

3. The method of claim 2, further comprising re-applying the functional block recognition rules to re-analyze the image data in response to determining that the functional blocks do not comply with the functional block syntax rules.

4. The method of claim 3, wherein determining that the functional blocks do not comply with the functional block syntax rules comprises initially recognizing that the second functional block precedes the first functional block.

5. The method of claim 1, further comprising re-applying the functional block recognition rules to re-analyze the image data in response to determining that the functional blocks do not comply with the functional block syntax rules.

6. The method of claim 1, wherein the functional blocks are matched to one or more functional blocks of a library.

7. The method of claim 6, wherein the first computer operation corresponds to a first computer function included in a library.

8. The method of claim 1, wherein the first functional block is associated with an input that corresponds to an argument of the first computer operation, and wherein the first functional block is further associated with an output that corresponds to a result of performing the first computer operation.

9. The method of claim 1, wherein the functional blocks are reordered based upon the hierarchy of operations associated with the functional blocks.

10. The method of claim 1, further comprising generating program code based on the functional graph, wherein the functional blocks correspond to functions that are called during execution of the program code, and wherein the program code is generated further based on an availability of hardware resources including one or more central processing units (CPUs), one or more graphics processing units (GPUs), one or more digital signal processors (DSPs), one or more field-programmable gate arrays (FPGAs), one or more application-specific integrated circuits (ASICs), one or more physical memory devices, one or more interconnections, or a combination thereof.

11. The method of claim 1, further comprising:
   depicting the functional graph at a graphical user interface (GUI); and
   prompting a user regarding the functional graph using the GUI.

12. The method of claim 11, wherein the image is captured using a camera of a mobile device, wherein the functional graph is computer-generated using a processor of the mobile device, and wherein the GUI is presented at a display of the mobile device.

13. The method of claim 12, further comprising:
   receiving user input indicating a modification of the functional graph; and
   updating the functional graph based on the user input.

14. The method of claim 12, further comprising:
receiving user input confirming the functional graph; and
in response to receiving the user input, generating program code corresponding to the functional graph.

15. The method of claim 1, wherein the scene includes a whiteboard, and wherein the diagram is drawn on the whiteboard.

16. The method of claim 1, further comprising accessing a database of diagram-to-graph conversion rules including graph topology rules, graph interconnection rules, linguistic rules, or a combination thereof, wherein applying the functional block recognition rules includes applying one or more of the diagram-to-graph conversion rules to the image data, and wherein the functional graph is computer-generated by applying the one or more of the diagram-to-graph conversion rules to the image data.

17. The method of claim 16, wherein the graph topology rules include rules for recognizing a functional block of the functional graph, a decision block of the functional graph, or a combination thereof.

18. The method of claim 16, wherein the graph interconnection rules include rules for recognizing an interconnection between nodes of the functional graph.

19. The method of claim 18, wherein the rules for recognizing the interconnection include rules for recognizing an input pin associated with the interconnection and an output pin associated with the interconnection.

20. The method of claim 16, wherein the linguistic rules include optical character recognition (OCR) rules, vocabulary rules, syntax rules, or a combination thereof.

21. The method of claim 16, wherein the diagram-to-graph conversion rules include color recognition rules.

22. The method of claim 1, wherein the image is captured at a mobile device, and further comprising generating, at the mobile device, program code corresponding to the functional graph.

23. The method of claim 1, wherein the image is captured at a mobile device, and further comprising generating, at a computer that is distinct from the mobile device, program code corresponding to the functional graph.

24. An apparatus comprising:
a memory configured to store functional block recognition rules; and
a processor configured to apply the functional block recognition rules to image data of an image of a scene that includes a portion of a diagram representing functional blocks to:
recognize the functional blocks, wherein the functional blocks include at least a first functional block associated with a first computer operation;
determine whether the functional blocks comply with functional block syntax rules, wherein the functional block syntax rules indicate a hierarchy of operations associated with the functional blocks; and
computer-generate a functional graph corresponding to the diagram based on the functional blocks complying with the functional block syntax rules, wherein the functional graph includes a graphical representation of the functional blocks.

25. The apparatus of claim 24, wherein the processor is further configured to perform the first computer operation using an argument associated with the first computer operation, the argument recognized from the diagram using optical character recognition (OCR) rules.

26. The apparatus of claim 24, further comprising a display configured to depict the functional graph and further configured to prompt a user regarding the functional graph.

27. The apparatus of claim 26, further comprising an input device configured to receive input from the user adding one or more components to the functional graph in response to prompting the user.

28. The apparatus of claim 27, wherein the one or more components include a functional block, a decision block, a connection, or a combination thereof.

29. The apparatus of claim 24, further comprising a mobile device, wherein the memory and the processor are integrated within the mobile device.

30. The apparatus of claim 24, wherein the processor is further configured to generate program code corresponding to the functional graph.

31. The apparatus of claim 24, wherein the functional graph is a connected directed acyclic graph (DAG).

32. An apparatus comprising:
means for storing functional block recognition rules; and
means for applying the functional block recognition rules using image data of an image of a scene that includes a portion of a diagram representing functional blocks, wherein the means for applying the functional block recognition rules comprises:
means for recognizing the functional blocks, wherein the functional blocks include at least a first functional block associated with a first computer operation;
means for determining whether the functional blocks comply with functional block syntax rules, wherein the functional block syntax rules indicate a hierarchy of operations associated with the functional blocks; and
means for generating a functional graph corresponding to the diagram based on the functional blocks complying with the functional block syntax rules, wherein the functional graph includes a graphical representation of the functional blocks.

33. The apparatus of claim 32, wherein the first functional block corresponds to a digital processing block that is called during execution of a computer vision application.

34. A non-transitory computer-readable medium storing instructions that are executable by a processor to cause the processor to perform operations comprising:
capturing an image of a scene that includes a portion of a diagram representing functional blocks, wherein the functional blocks include at least a first functional block associated with a first computer operation;
applying functional block recognition rules to image data of the image to recognize the functional blocks;
determining whether the functional blocks comply with functional block syntax rules, wherein the functional block syntax rules indicate a hierarchy of operations associated with the functional blocks; and
computer-generating a functional graph corresponding to the diagram based on the functional blocks complying with the functional block syntax rules, wherein the functional graph includes a graphical representation of the functional blocks.

35. The computer-readable medium of claim 34, wherein applying the functional block recognition rules comprises:
accessing a library of functional blocks; and
recognizing the functional blocks using the library of functional blocks.

36. The computer-readable medium of claim 34, wherein applying the functional block recognition rules to the image data includes applying graph topology rules to the image data, and wherein the graph topology rules include rules for recognizing a functional block of the functional graph, a decision block of the functional graph, or a combination thereof.

37. The computer-readable medium of claim 34, wherein applying the functional block recognition rules to the image data includes applying graph interconnection rules to the image data, and wherein the graph interconnection rules include rules for recognizing an interconnection between nodes of the functional graph.

38. The computer-readable medium of claim 34, wherein applying the functional block recognition rules to the image data includes applying linguistic rules to the image data, and wherein the linguistic rules include optical character recognition (OCR) rules, vocabulary rules, syntax rules, or a combination thereof.

* * * * *